(12) United States Patent
Retting et al.

(10) Patent No.: US 10,884,717 B2
(45) Date of Patent: Jan. 5, 2021

(54) RESOURCE MANAGEMENT SYSTEM FEATURING A SENSOR-AGNOSTIC SOFTWARE ARCHITECTURE

(71) Applicant: Raytheon Company, Waltham, MA (US)

(72) Inventors: Ryan D. Retting, Torrance, CA (US); Russell W. Lai, Rancho Palos Verdes, CA (US); Michael L. Garibay, Long Beach, CA (US)

(73) Assignee: RAYTHEON COMPANY, Waltham, MA (US)

(*) Notice: Subject to any disclaimer, the term of this patent is extended or adjusted under 35 U.S.C. 154(b) by 0 days.

(21) Appl. No.: 16/378,882

(22) Filed: Apr. 9, 2019

(65) Prior Publication Data
US 2020/0326915 A1    Oct. 15, 2020

(51) Int. Cl.
*G06F 9/44* (2018.01)
*G06F 8/36* (2018.01)
(Continued)

(52) U.S. Cl.
CPC .......... *G06F 8/36* (2013.01); *G06F 8/60* (2013.01); *G06F 9/50* (2013.01); *G06F 9/541* (2013.01); *G06F 11/3089* (2013.01)

(58) Field of Classification Search
CPC ..... G06F 8/36; G06F 8/60; G06F 9/50; G06F 9/541
See application file for complete search history.

(56) References Cited

U.S. PATENT DOCUMENTS

| 7,081,849 B2 | 7/2006 | Collins et al. |
| 8,396,730 B2 | 3/2013 | Khosla et al. |
| (Continued) | | |

OTHER PUBLICATIONS

Anonymous "Integrated development environment" Wikipedia <URL: https://en.wikipedia.org/w/index.php?title=Integrated_development_environment&oldid=891240784#Visual_programming> Apr. 6, 2019 [retrieved on Jun. 29, 2020] (7 pages).
Anonymous "Object-oriented programming" Wikipedia <URL: https://en.wikipedia.org/w/index.php?title=Object-oriented_programming&oldid=889538564> Mar. 26, 2019 [retrieved on Jun. 30, 2020] (19 pages).

(Continued)

*Primary Examiner* — Lewis A Bullock, Jr.
*Assistant Examiner* — Tina Huynh
(74) *Attorney, Agent, or Firm* — Cantor Colburn LLP

(57) ABSTRACT

A system includes a plurality of program components, including one or more sensor-agnostic components, one or more sensor-specific components, and a base subsystem manager (SSM) class. The sensor-agnostic components are preestablished, where each sensor-agnostic component is configured to be independent of sensor domain. The sensor-specific components are preestablished, where each sensor-specific component is customizable for use with a chosen sensor domain. The base SSM class is instantiated into a first SSM for a first subsystem comprising one or more resources, including at least one sensor. The system further includes a development environment configured to access the sensor-agnostic components and the sensor-specific components, and to enable combination of the sensor-agnostic components and the sensor-specific components. The sensor-agnostic components and the sensor-specific components are configured to interconnect in a plurality of combinations to form a program.

14 Claims, 17 Drawing Sheets

(51) Int. Cl.
*G06F 8/60* (2018.01)
*G06F 9/50* (2006.01)
*G06F 9/54* (2006.01)
*G06F 11/30* (2006.01)

(56) References Cited

U.S. PATENT DOCUMENTS

| | | | | |
|---|---|---|---|---|
| 2004/0006761 | A1* | 1/2004 | Anand | G06F 8/00 |
| | | | | 717/101 |
| 2007/0143452 | A1* | 6/2007 | Suenbuel | G06F 8/30 |
| | | | | 709/220 |
| 2008/0255911 | A1 | 10/2008 | Khosla | |
| 2013/0067429 | A1* | 3/2013 | Jang | G06F 8/36 |
| | | | | 717/105 |
| 2017/0353542 | A1* | 12/2017 | Hammadou | H04L 67/125 |

OTHER PUBLICATIONS

Gamma et al. "Design Patterns, passage" Design Patterns (Jan. 1, 1995) pp. 139-150.
International Search Report and Written Opinion for International Application No. PCT/US2020/027000; Date of Filing Apr. 7, 2020; dated Jul. 17, 2020 (16 pages).
Ochem "Object Orientation in Embedded Critical Systems—don't be scared anymore!—Electronic Design" <URL https://www.electronicdesign.com/technologies/embedded-revolution/article/21798900/object-orientation-in-embedded-critical-systems-dont-be-scared-anymore> Dec. 7, 2012 [retrieved on Jun. 29, 2020] (17 pages).
Seidewitz et al. "An object-oriented approach to parameterized software in Ada" Eighth Washington Ada Symposium (Jun. 1991) pp. 62-76.

* cited by examiner

RESOURCE MANAGEMENT SYSTEM FEATURING A SENSOR-AGNOSTIC SOFTWARE ARCHITECTURE

BACKGROUND

The present invention relates to resource management and, more specifically, to a resource management system featuring a sensor-agnostic software architecture.

Generally, a sensor is a device that measures a physical property and, as a result, generates a signal describing the physical property. Sensors span a wide range of devices, such as, for example, devices for radars, electro-optical and infrared (EOIR) detectors, communications (comms), electronic warfare (EW), infrared (IR), accelerometers, motion detectors, and microphones. Software programs are often built over sensors in order to utilize the signals output by sensors. Typically, these programs are sensor-aware, such that the programs can communicate with the sensors being used in languages or protocols native to the sensors.

SUMMARY

Embodiments of the present invention are directed to a system for managing resources. A non-limiting example of the system includes a plurality of program components, including one or more sensor-agnostic components, one or more sensor-specific components, and a base subsystem manager (SSM) class. The one or more sensor-agnostic components are preestablished, where each sensor-agnostic component is configured to be independent of sensor domain. The one or more sensor-specific components are preestablished, where each sensor-specific component is customizable for use with a chosen sensor domain. The SSM is configured to be instantiated into a first SSM for a first subsystem comprising one or more resources, where at least one of the one or more resources of the first subsystem is a sensor. The system further includes a development environment configured to access the one or more sensor-agnostic components and the one or more sensor-specific components, and to enable selection and combination of the one or more sensor-agnostic components and the one or more sensor-specific components. The one or more sensor-agnostic components and the one or more sensor-specific components are configured to interconnect in a plurality of combinations to form a program.

Embodiments of the present invention are directed to a computer-implemented method for managing resources. A non-limiting example of the computer-implemented method includes providing a plurality of program components, which include one or more sensor-agnostic components, one or more sensor-specific components, and a base SSM class. The one or more sensor-agnostic components are preestablished, where each sensor-agnostic component is configured to be independent of sensor domain. The one or more sensor-specific components are preestablished, where each sensor-specific component is customizable for use with a chosen sensor domain. The SSM is configured to be instantiated into a first SSM for a first subsystem comprising one or more resources, where at least one of the one or more resources of the first subsystem is a sensor. The computer-implemented method further includes combining at least a subset of the one or more sensor-agnostic components and the one or more sensor-specific components into a program. The one or more sensor-agnostic components and the one or more sensor-specific components are configured to interconnect in a plurality of combinations.

Embodiments of the invention are directed to MFSS. A non-limiting example of the MFSS includes an interface enabling access to a plurality of program components and enabling selection and combination of the plurality of program components to form a program. The plurality of program components include one or more sensor-agnostic components, one or more sensor-specific components, and a base SSM class. The one or more sensor-agnostic components are preestablished in one or more sensor-agnostic base classes, where each sensor-agnostic component is configured to be independent of sensor domain. The one or more sensor-specific components are preestablished in one or more sensor-specific bases classes, where each sensor-specific component is customizable for use with a chosen sensor domain. The SSM is configured to be instantiated into a first SSM for a first subsystem comprising one or more resources, where at least one of the one or more resources of the first subsystem is a sensor. The one or more sensor-agnostic components and the one or more sensor-specific components are configured to interconnect in a plurality of combinations.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE SEVERAL VIEWS OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
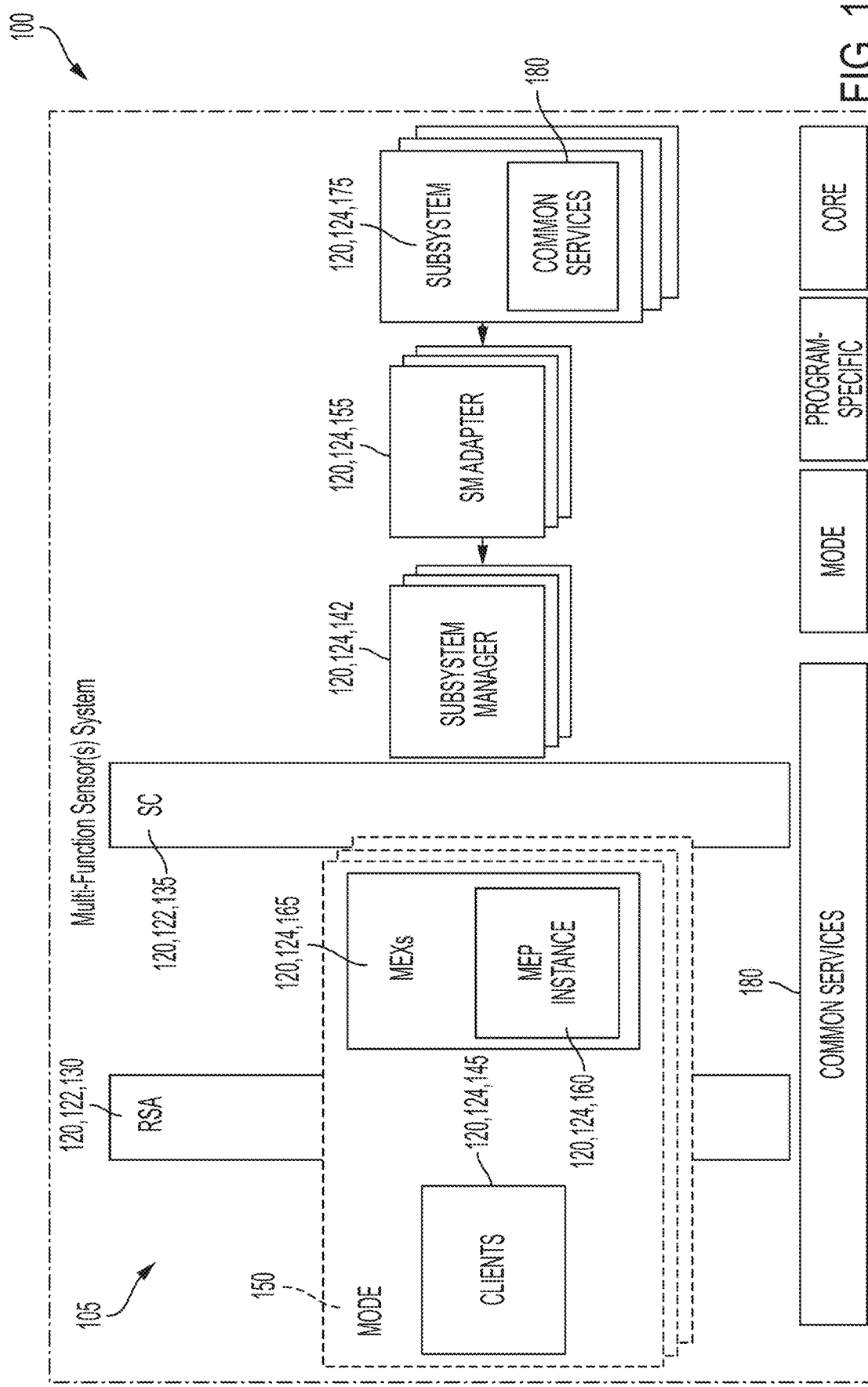
FIG. 1 is a block diagram of a software architecture, as shown Multi-Function Sensor System of a resource-management (RM) system, according to some embodiments.

The diagrams depicted herein are illustrative. There can be many variations to the diagram or the operations described therein without departing from the spirit of the invention. For instance, the actions may be performed in a differing order or actions may be added, deleted or modified.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections or positional relationships, unless otherwise specified, can be direct or indirect, and the present invention is not intended to be limited in this respect. Moreover, the various tasks and process operations described herein can be incorporated into a more comprehensive procedure or process having additional steps or functionality not described in detail herein, or one or more tasks or operations may be optional without departing from the scope of the invention.

The following definitions and abbreviations are to be used for the interpretation of the claims and the specification. As used herein, the terms "comprises," "comprising," "includes," "including," "has," "having," "contains," or "containing," or another variation thereof, are intended to cover a non-exclusive inclusion. For example, a composition, mixture, process, method, article, or apparatus that comprises a list of elements is not necessarily limited to only those elements but can include other elements not expressly listed or inherent to such composition, mixture, process, method, article, or apparatus.

Additionally, the terms "at least one" and "one or more" may be understood to include a number greater than or equal to one (e.g., one, two, three, four, etc.). The term "a plurality" may be understood to include a number greater than or equal to two (e.g., two, three, four, five, etc.). The terms "about," "substantially," or "approximately," or variations thereof, are intended to include a degree of error associated with measurement of the particular quantity based upon the equipment available.

For the sake of brevity, conventional techniques related to making and using aspects of the invention may or may not be described in detail herein. In particular, various aspects of computing systems to implement the various technical features described herein may be well known. Accordingly, in the interest of brevity, some conventional implementation details are only mentioned briefly herein or are omitted entirely without providing the well-known system or process details.

Turning now to an overview of technologies that are more specifically relevant to aspects of the invention, typically, each software product line is unique and built based on the sensor domain required for the product line. However, in many cases, similar functions are used across sensor domains. For instance, multi-function sensors are increasing in usage, and thus, programs based on these sensors would ideally able to operate over multiple sensor domains. Common capability requirements, such as those involved in anti-access/aerial denial (A2/AD) applications in various domains, are driving convergence of radio frequency (RF) and optical systems. Next-generation air dominance systems require persistent, passive intelligence/surveillance/reconnaissance (ISR) and integrated fire control systems to meet next-generation threats.

In some cases, program development involves a technique known as clone-and-own, which involves copying existing code from a program utilizing a first sensor domain and modifying that code to suit the program being developed for another sensor domain. However, clone-and-own is prone to a wide range of errors given that it requires manually identifying changes that need to be made for the product and making those changes.

One or more embodiments address the above-described shortcomings of the prior art by providing an object-oriented system with a software architecture that enables products, such as programs, to be built based on established interfaces, modules, code blocks, and other components. Some embodiments of the invention include both sensor-agnostic and sensor-specific components, where sensor-agnostic components are designed for compatibility regardless of sensor domain, and where sensor-specific component are designed for a specific sensor domain (i.e., one or more specific sensors or specific sensor categories). While sensor-agnostic components may be core components useable across multiple sensor domains, both sensor-agnostic and sensor-specific components may be instantiated from base classes and used or customized by a user. Through an integrated development environment (IDE), or other appropriate environment, some embodiments enable a user to add components to a program in development and, as needed, and to extend those components as needed. Further, some embodiments provide a composable deployment of the micro-services architecture allowing for multi-program, cradle-to-grave variance management from a single, shared codebase. More specifically, for instance, the user is enabled to specify which features of the program are compiled, which binaries are packaged, the runtime configuration, and whether to enable extensions after deployment.

In short, some embodiments of the invention provide one or more of the following features: sensor-agnostic resource management services applicable to various sensor domains, such as an EOIR detector, fire control radar, surveillance radar, other radar, EW systems, infrared (IR), accelerometers, motion detectors, microphones, and comms, such that sensors of multiple types can be deployed concurrently or separately; decoupling of sensor-agnostic and sensor-specific components as, respectively, core and managed variants; an object-oriented approach that enables multiple sensor domains to use common resource-management (RM) algorithms and interfaces; use of polymorphic types to allow for modes (i.e., a combination of a client, a measurement and effects processing (MEP) instance, and a mode executive (MEX)) to interface with common, sensor-agnostic RM services across process spaces; a composable microservices-based deployment architecture, which reduces or eliminates the need to clone-and-own across similar or disparate sensor domains, and which uses managed variants as shared libraries, allowing for runtime configuration and swapping of modules for functionality, testing, or exportability.

FIG. 1 is a block diagram of a software architecture 105 of an RM system 100, according to some embodiments of this disclosure. In some embodiments, each program built or buildable according to the architecture 105 belongs to one or more product families defined by the architecture 105. Thus, the RM system 100 may define the architecture 105 as well as one or more product families.

In some embodiments, the RM system 100 defines a set of program components 120, including one or more core components 122, also referred to as sensor-agnostic components 122, and one or more program-specific components 124, also referred to as sensor-specific components 124 or managed variants 124. A component 120 may be, for example, a block of code implementing an interface or performing a task. For example, and not by way of limitation, a component 120 may be a pre-built microservice. The RM system 100 may include a set of built-in components 120 that are preexisting, and which may be combined into a program, along with extensions as needed, in combination with custom or customized components 120 provided by the user. The RM system 100, may enable extensibility of some or all built-in components 120, thereby allowing the user to modify or add code to the components 120 as needed. The architecture 105 is described herein as being object-oriented because each component 120 utilized in a program may be based on a base component 120 that is pre-built and included in the RM system 100 and then instantiated and extended as needed for the user's purposes.

Generally, a core component 122 may be sensor-agnostic in the sense that it is independent of underlying sensors (220, see FIG. 2) and may thus be useable regardless of the sensor domain (i.e., one or more sensors grouped together) over which the software is to be used. In some embodiments, some or all sensor-agnostic components 122 are hardware-agnostic, given that a sensor is typically implemented as hardware. For example, and not by way of limitation, core components 122 may include a resource scheduler and resource allocator, which may be integrated together, and a sensor controller. In contrast a sensor-specific component 124 may be specific to a sensor domain or to a specific program. For instance, a sensor-specific component 124 may incorporate one or more assumptions about the nature of an underlying sensor, while a sensor-agnostic component 122 does not incorporate such assumptions, according to some embodiments. In some embodiments, sensor-specific components 124 may be created as new components 120 or may be instantiated from base components 120 and customized as needed, to support a specific sensor domain or specific tasks required by the user. Regardless of the type of component 120, however, the RM system 100 may enable the user to modify the component 120 as desired by the user. Through the RM system 100, a user may combine sensor-agnostic core components 122 with sensor-specific components 124 to provide a program that operates over a desired sensor domain and incorporates core features available through the core components 122.

As will be described in detail below, in some embodiments, the RM system 100 is, or includes, a cross-domain system and a product-family architecture supporting next-generation multifunction systems and sensors. The RM system 100 may provide an operating environment, services, development and support tools, or a combination of these. To this end, some embodiments may utilize multi-layered resource management along with the latest software and hardware advances, which may include commercial off-the-shelf (COTS) hardware or DevOps automation. The architecture 105 may be an open architecture, enabling upgrades and add-ons, which may be provided by a user when building or deploying a program. Further, in some embodiments, the architecture 105 may be modular, through the use of components 120, and may be extensible for the addition or removal of components 120 or portions of components 120. In some embodiments, the use of components 120 may enable a plug-and-play architecture 105, such that components 120 fit together without further customization, unless desired by the user. As described below, the architecture 105 may be layered, and each layer may be extensible to add or tailor functionality and to provide portability across operating systems and hardware. Further, in some embodiments, the RM system 100 may enable customizable deployment, such as via containers, virtual machines, or bare metal.

Figure 2:
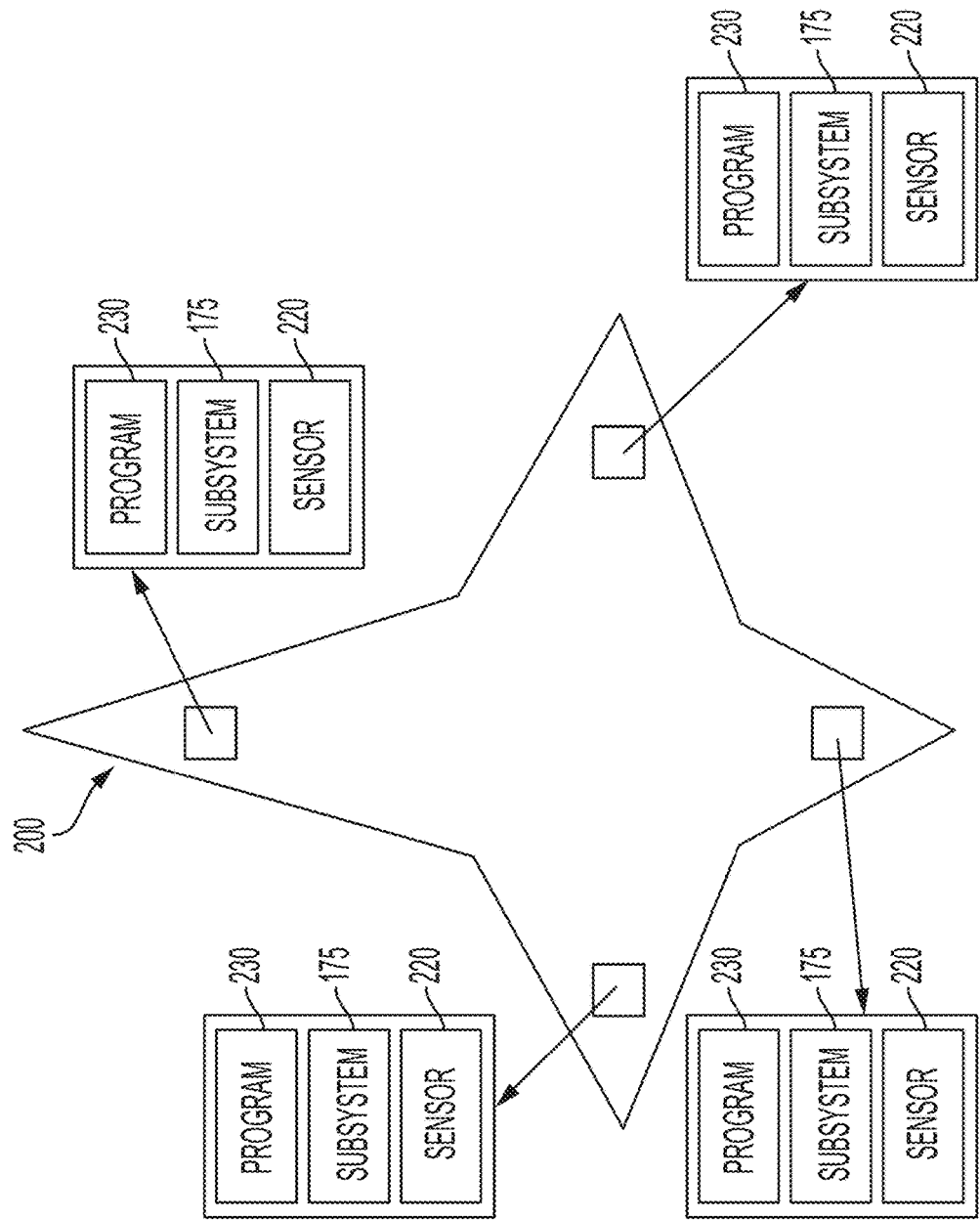
FIG. 2 is a block diagram of deployed programs of the RM system on a multifunction device, specifically an aircraft, according to some embodiments.

FIG. 2 is a block diagram of deployed instantiations (i.e., deployed programs 230) of the RM system 100 on a multifunction device 200, specifically an aircraft, according to some embodiments of the invention. As shown in FIG. 2, the device 200 may include one or more subsystems 175, each of which may be a basis of an instantiation (i.e., a deployed program 230) of the RM system 100 over a respective sensor domain. In the example of FIG. 2, four such subsystems 175 exist on the device 200: a multifunction radio frequency subsystem 175, a pod infrared search and track subsystem 175, a low-band subsystem 175, and an EW subsystem 175. In some embodiments, each such subsystem 175 may be deployed atop a corresponding sensor domain that includes one or more sensors 220. Thus, each subsystem 175 may be built for a corresponding sensor domain, using sensor-agnostic components 122 as well as sensor-specific components 124 that are designed for the sensor domain.

Although an aircraft is shown as the multifunction device 200 in FIG. 2, it will be understood that embodiments of the RM system 100 are useable for various systems and devices that can utilize multiple sensors or multifunction sensors. For example, and not by way of limitation, embodiments of the RM system 100 may be appropriate for autonomous vehicles, weapons, or drones. Embodiments of the RM system 100 are useable for land, sea, and space systems and need not be limited to military use.

Figure 3:
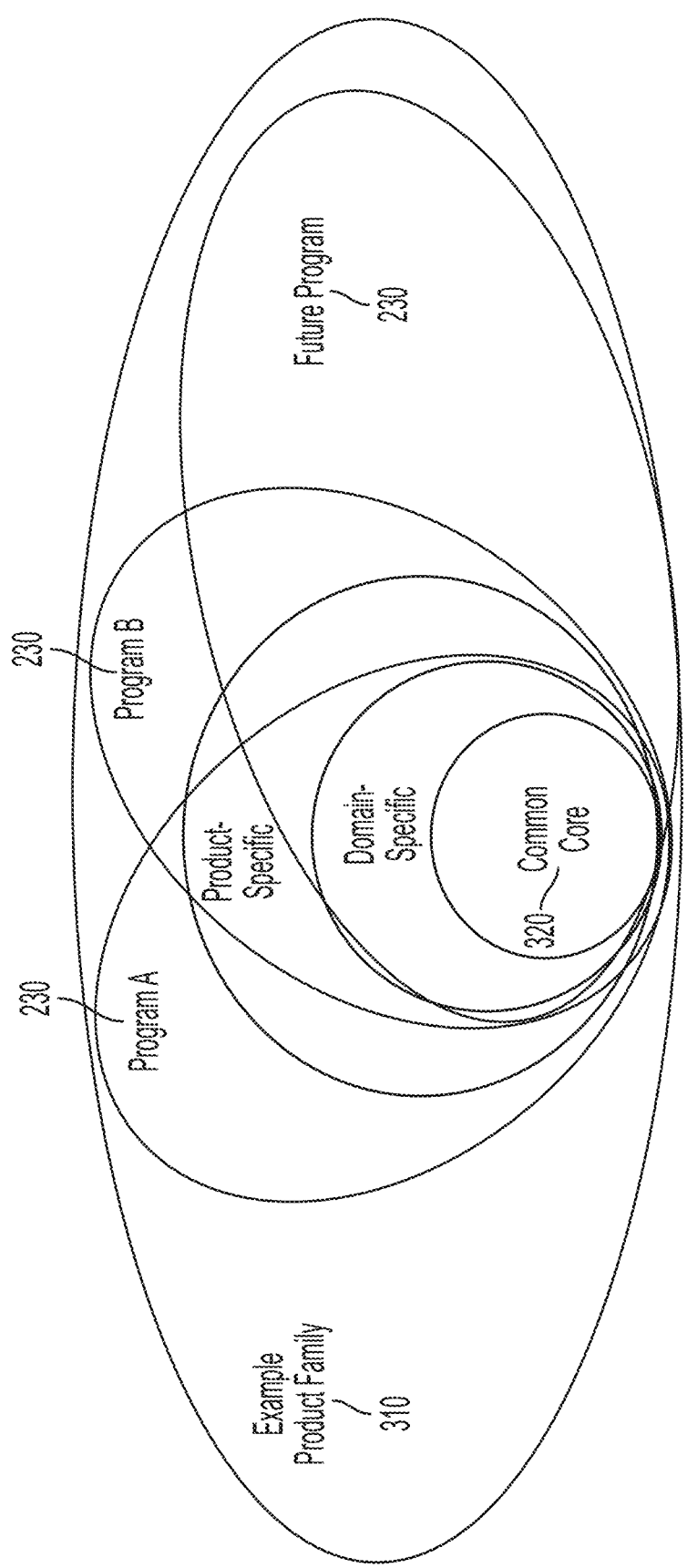
FIG. 3 is a Venn diagram illustrating the product line relationships between components of the micro-services architecture of the RM system, according to some embodiments.

FIG. 3 is a Venn diagram illustrating relationships between components 120 of the architecture 105, according to some embodiments of the invention. Generally, the architecture 105 of the RM system 100 may enable users to build software programs 230 belonging to one or more product families 310. In FIG. 3, Program A and Program B are examples of such programs 230, which belong to a larger product family 310. Additionally, as shown, Future Program may be built within the product family 310 in the future as well, also based on the architecture 105. Each of such programs 230 may include a common core 320, which may be made up of core components 122. In some embodiments of the invention, the common core 320 includes a services framework, common resource management, and a common security framework, for example, each of which are sensor-agnostic components 122. In this example, all the programs 230 shown utilize a common domain of sensors 220 and belong to a common product family 310.

As mentioned above, components 120 may be categorized as sensor-agnostic or sensor-specific. In some embodiments, however, sensor-specific components 124 can be further categorized as domain-specific, product-specific, or product-variant. Generally, domain-specific components 120 may be sensor-specific components 124 associated with a specific domain of sensors 220. In some embodiments, the RM system 100 may include one or more pre-built or user-defined components 120 designed for a specific sensor domain, and these may be classified domain-specific. For example, and not by way of limitation, core components 122 may include components 120 providing services framework, common resource framework, and common security framework, while domain-specific components 120 may include components providing modular subsystem management, signal processing framework, and common modes 150.

Product-specific components 120 may be sensor-specific components 124 associated with a specific product family 310, where a product family 310 is a class or type of program 230 for performing a specific set or type of tasks. In some embodiments, the RM system 100 may include one or more pre-built components 120 or user-defined component 120 designed for specific product families, and these may be product-specific. The RM system 100 may support one or more product families. However, it will be understood that a user may use the RM system 100 and the IDE 110 therein to build a program 230 in a product family 310 for which the RM system 100 does not natively include product-specific components 120, and such programs 230 would then belong to a different product family 310 than those for which product-specific components 120 are natively available (i.e., as pre-built components 120). In that case, the user may be required to provide his or her own product-specific components 120, which the RM system 100 may then save for future use. Thus, the RM system 100 may be extensible with respect to supported product families 310. For example, and not by way of limitation, product-specific components 120 may include components 120 providing for product-specific modes 150 and product family subsystems 175.

Product variants, or product-variant components 120, may be sensor-specific components associated with a specific program 230, and thus including variations further customized for the program 230 within the applicable product family 310. For example, and not by way of limitation, product variants may include specialized subsystems 175, security solutions, and specialized security.

In some embodiments of the invention, components 120 in each of these categories of program-specific components 124 are modifiable by a user developing a program 230. Typically, however, in some embodiments of the invention, it is expected that the amount of modifications made by the user will decrease from the program variants, to the program specific, to the domain specific, to the common core 320.

For example, and not by way of limitation, examples of core components 122 include the following, which are illustrated in FIG. 1: a resource scheduler/allocator (RSA) 130; a sensor controller (SC) 135; and an abstract subsystem manager (SSM) that can be instantiated into an SSM 142, which may be a program-specific component 124. Thus, an instantiated SSM 142 may include both core and program-specific elements. Additional examples of core components 122, shown later in FIG. 10, may include: a signal-processing resource manager (SPRM) 650, a signal-processing subsystem manager (SP) SSM 620, a signal-processing subsystem (SP SM) adapter 630, a signal-processing data distributor (SPDD) 1060, and a signal-processing measurement and effects processing (SP MEP) controller 1070. A further example of a core component 122, although not shown, is a resource fast state controller (RFSC).

In some embodiments, the RSA 130 selects a resource request to schedule next from among a pending queue of resource requests submitted by clients 145, shown in FIG. 1, based on attributes such as rank, priority, or other constraints. The RSA 130 may perform data prefetching for requests. When a resource request is selected from the pending queue, an allocator aspect of the RSA 130 may assess or predict resource availability and allocate accordingly. The RSA 130 may use SSMs 142 with generic interfaces to support availability, feasibility, and allocation of various subsystems 175. The RSA 130 may provide a common API to applications, such that the application may use this API to submit resource requests. Thus, in some embodiments, without modification, a common RSA 130 may be used for various sensor domains, such as an EOIR detector, radar, and EW systems. Further, the functionality of the RSA 130 may be extended through the use of various SSMs 142.

In some embodiments, the SC 135 is a common execution engine for MEXs 165 to execute their modes 150 across a synchronized set of subsystems 175. The SC 135 may provide an API and an abstraction layer for configuring and using subsystem resources that have been allocated by the RSA 130. The SC 135 may provide mechanisms and abstractions for the MEXs 165 to synchronize time-critical hardware configuration updates and commands throughout execution. Further, the SC 135 may orchestrate hardware configuration across the synchronized subsystems 175 and, as needed, across a hard-real-time RFSC service. In some embodiments, without modification, a common SC 135 may be used for various sensor domains, and the functionality of the SC 135 may be extended through the use of various SSMs 142.

In some embodiments, the RFSC is the fastest layer, or one of the fastest layers, of resource management, enabling synchronization and management of heterogeneous resources up to pulse level (i.e., nanoseconds). Depending on program requirements, the RFSC may be implemented in firmware for best performance, but this is not required. In some embodiments, the RFSC is a core component 122 that can be used for various sensor domains. However, the architecture 105 may allow for interfacing to program-specific firmware or software, with specific hardware (e.g., low-voltage differential signaling hardware). However, in some embodiments, the RFSC may be tailored out such that it is not incorporated into a program 230 of the RM system 100 at all.

According to the architecture 105, each SSM 142 manages a respective subsystem 175 that requires resource management (e.g., sensor management). The core components 122 may include an abstract base class SSM 140 for common functionality and ease of extension. In some embodiments, functionality of the abstract base class for SSMs 142 is extensible by way of an SSM 142 deriving from the common base class.

In the example Multi-Function Sensor(s) System 110 shown in FIG. 1, each component 120 is classified as a combination of one or more of the following according to the Multi-Function Sensor(s) System 110: mode, program-specific, and core. Generally, for at least the purposes of the Multi-Function Sensor(s) System 110, sensor-specific components 124 can be classified as modes 150 or program-specific. As described above, a mode 150 may be a specific type of sensor-specific, or program-specific, component 120; however, this example Multi-Function Sensor(s) System 110 separates modes 150 from other program-specific components 124 for the user's convenience. It will be understood that this further classification is not required in the Multi-Function Sensor(s) System. In FIG. 1, core components 122 are illustrated in white, program-specific components 124 other than modes 150 are illustrated in gray, and modes 150 are illustrated in black. As illustrated by the gradient from gray to white in FIG. 1, an SSM 142 may incorporate both core components 122 and program-specific components 124. In other words, an SSM 142 may be added to the Multi-Function Sensor(s) System 110 and then modified by the user.

FIG. 1 shows a generalized example of a program 230 built in the Multi-Function Sensor(s) System 110 according to the architecture 105 of the RM system 100. This example utilizes one or more subsystems 175, including one subsystem 175 per sensor domain, which may communicate with underlying sensors 220 in real time or non-real time. The subsystems 175 may support shared common services 180, that can be provided regardless of the sensor domain. Each subsystem 175 may include one or more core components 122, which may be preestablished and ready for use by a user, according to some embodiments of the invention. An SSM 142 may manage a respective subsystem 175, while a subsystem (SM) adapter 155 may provide an interface between the SSM 142 and the subsystem itself (i.e., the sensor domain). The SSM 142 may include core components 122, as well as program-specific components 124. In other words, some aspects of the SSM 142 may be common to enable use of the common services 180 or otherwise, while other aspects may be specific to the application to be performed by the program 230 being developed. The SM adapter 155 may be program-specific, such that the SM adapter 155 may be aware of how to communicate between the SSM 142, which may itself include program-specific components 124, and the subsystem 175.

Each program 230 according to the architecture 105 may further include one or more clients 145 and one or more sensors 220. Generally, a program 230 may be designed to search, locate, verify, track, identify, or perform other tasks based on the sensors 220 available. To this end, each client 145 of a program 230 performs one or more tasks, or sub-tasks. A client 145 may create a request to a sensor 220, and the RSA 130 may receive that request, as described above. The RSA 130 may allot time on the sensor 220 to the client 145 for the request, and through the SC 135, the MEX 165 associated with the client 145 may configure the applicable subsystem 175 to perform operations necessary responsive to the request. The sensor 220 generates sensor data while performing such operations, and an MEP instance 160 associated with the client 145 the may perform signal processing on the sensor data. Together, a logical grouping of clients 145 and sensors 220 form a mode; for instance, the client 145, the MEX 165, and the MEP instance 160 together make up a mode 150.

Figure 4:
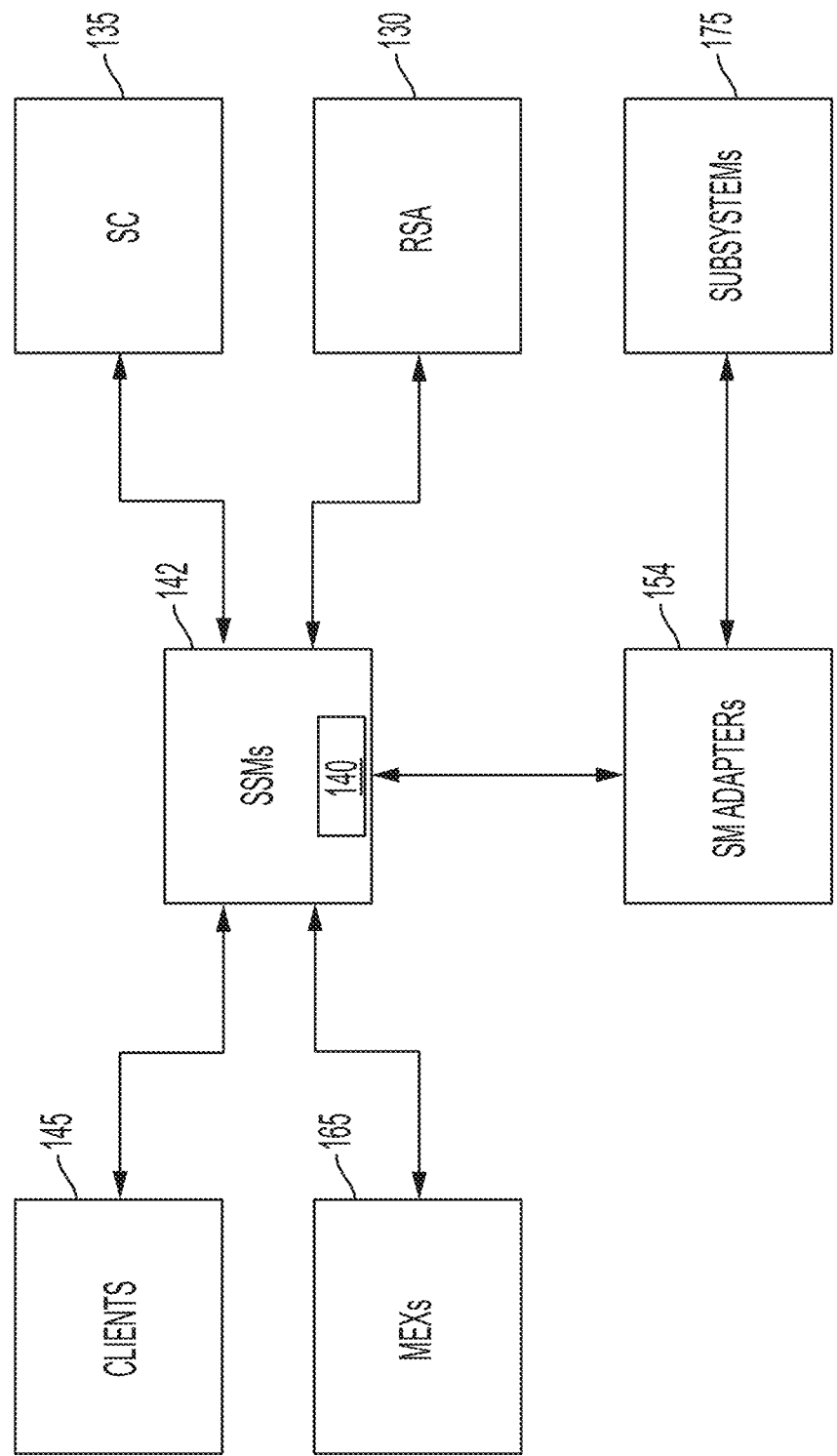
FIG. 4 is another block diagram of the system architecture of the RM system, according to some embodiments.

FIG. 4 is another block diagram of the architecture 105 of the RM system 100, according to some embodiments. More specifically, this diagram centers around a SSMs 142 and, more specifically, the base SSM 140, which acts as an abstract class that can be instantiated into SSMs 142 for various sensor domains. As shown, the base SSM 140 may be in communication with a base SM adapter 154, which is a base class for specific SM adapters 155. Along this line of communication, the base SSM 140 and the base SM adapter 154 may exchange, for example, subsystem status information; messages; commands; health reports; instructions to add, modify, or delete components 120; requests; and responses. The base SM adapter 154 may be in communication with a program-specific subsystem 175 over a sensor domain, such as a tuner, signal processor, or servo, which may be coded or otherwise provided by the user. The base SM adapter 154 and the program-specific subsystem 175 may exchange native status messages, commands, and health reports.

Generally, in some embodiments, all subsystem-specific (i.e., specific to a subsystem 175 over a sensor domain) functionality is encapsulated in derived SSM and SM adapter classes. SSMs 142 may allow plug-and-play of internal or external subsystem hardware into many functional services, including resource management (e.g., sensor management) services. In some embodiments, the use of SSMs 142 from base SSMs 140 standardizes interfaces for services to interact with subsystems 175 using object-oriented designs. Further, the use of SSMs 142 and SM adapters 155 from base classes may promote reuse and prevent vendor lock of components 120. For example, and not by way of limitation, a respective SSM 142 may be derived for each of the following sensor domains: antenna, EOIR, and other sensor payloads.

In some embodiments, the base SSM 140 includes an API, which enables one or more of the following to be communicated to the base SSM 140 for processing: request, release, or configure a resources; logging; health, status, or capabilities reporting; usage monitoring or reporting; Built-In Test (BIT) services; optional loading and managing of firmware or other software; models to predict behavior; and various application services.

The RSA 130 and the SC 135 may interface with generic base classes and interfaces, which may be instantiated for specific sensor domains or specific programs 230. The RSA 130 may interface with the base SSM 140 for resource scheduling, such as resource requests and results or such resource requests. The SC 135 may interface with the base SSM 140 for front-end configuration and control, such as subsystem configuration requests and subsystem status messages. As a result of these interfaces with base classes, such as the base SSM 140, the RSA 130 and SC 135 may be shared across sensor domains. Further, in some embodiments of the invention, to further support use across various domains, polymorphic types may be used by modes (e.g., by clients 145, MEXs 165, and MEP instances 160) to interface with the RSA 130 and the SC 135 regardless of sensor domain.

Figure 5:
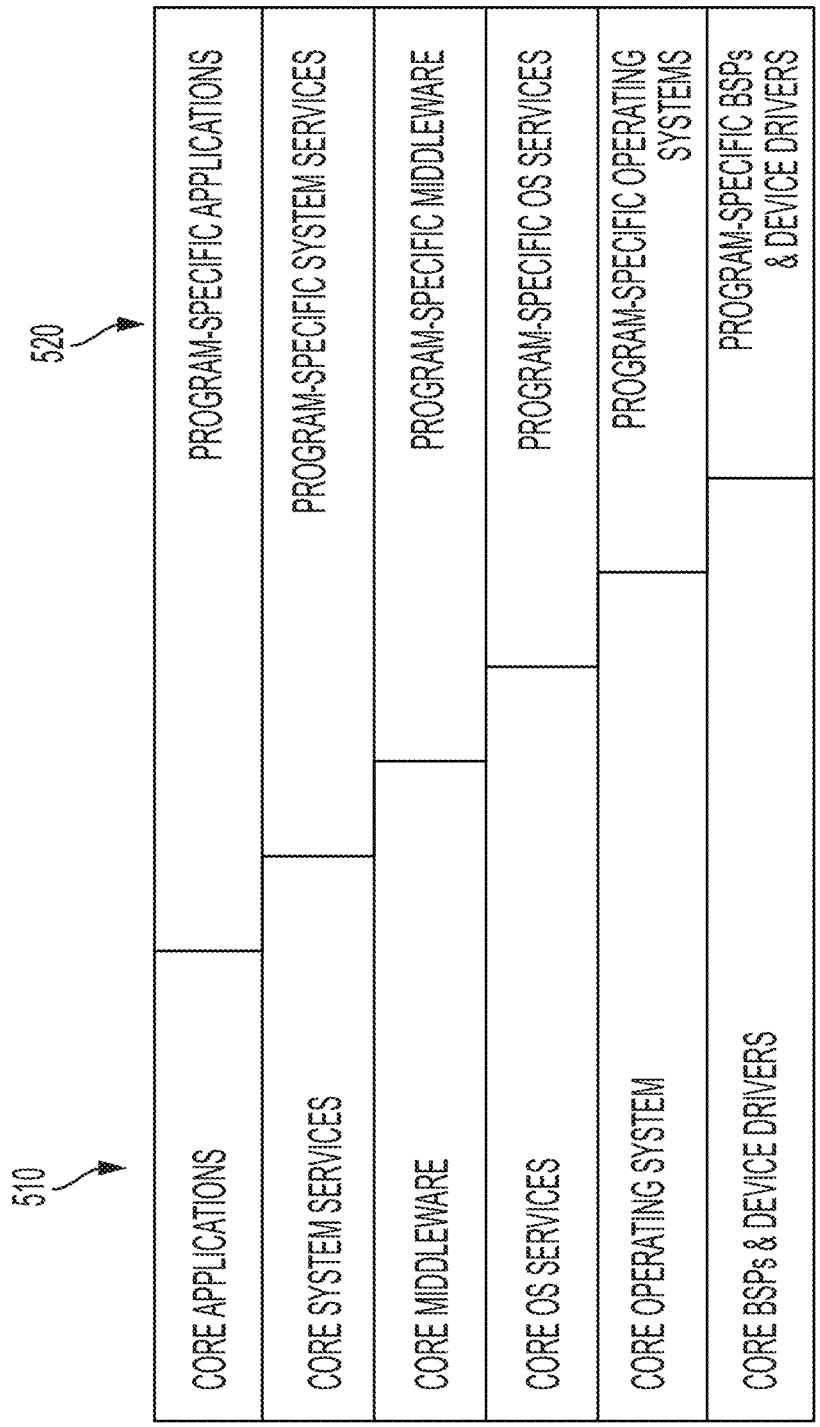
FIG. 5 illustrates a stack view of components in a program built according to the software architecture of the RM system, according to some embodiments.

FIG. 5 illustrates a stack view of components 120 in a program 230 built according to the architecture 105 of the RM system 100, according to some embodiments. In some embodiments, a program 230 built based on the architecture 105 of the RM system 100 may include core components 122 and program-specific components 124, among others. Further, in some cases, when utilized in a program 230, a core component 122 may be extended to include program-specific features, thus becoming both a core component 122 and a program-specific component 124 in the final program 230. To enable extensibility, for instance, each component 120 in a core stack 510 (i.e., each core component 122) may be extensible, such as by way of one or more APIs. Through such an API, the user may add to the core components 122 by adding program-specific features, which together make up a program-specific stack 520.

For example, and not by way of limitation, the core stack 510 may include some or all of the following core components 122: core application, core system services, core middleware, core operating system (OS) services, core operating systems, and core board support packages (BSPs) and device drivers. For instance, through an API, core applications may be extensible to add program-specific applications, which may be modes via a mode development kit (MDK). In some embodiments, typically, the amount of program-specific coding required for each core component 122 increases from core applications, to core system services, to core middleware, to core OS services, to core operating systems, and to core BSPs and device drivers, such that the amount of program-specific coding for program-specific components 124 typically decreases according from program-specific (PS) applications, to PS system services, to PS middleware, to PS OS services, to PS operating systems, and to PS BSPs and device drivers. In other words, in some embodiments of the invention, the core stack 510 promotes increased reuse approaching the bottom of the stack as shown, and the majority of program-specific code is targeted near the top.

For example, and not by way of limitation, for both the core stack 510 and program-specific stack 520, applications may include clients 145, MEXs 165, MEP instances 160, service managers, and generic applications; system services may include application management, logging, instrumentation, timing, navigation, activity management, resource allocation, subsystem management, operative state management, capabilities management, input/output management, or track database management; middleware may include Boost, Real-Time Innovations (RTI) Data Distribution Service (DDS), Portable Operating System Interface (POSIX) Message Queues (MQs), GIPC, encryption libraries, Docker, Software Communications Architecture (SCA), or Redhawk; OS services may include Trivial File Transfer Protocol (TFTP) server, File Transfer Protocol (FTP) server, POSIX server, network stacks, boot loaders, or file systems; operating systems may include Windows, Linux, Integrity, VxWorks, or a custom kernel; and BSPs and device drivers may include VxWorks 7 BSP, Linux device drivers, or custom device drivers.

Figure 6A:
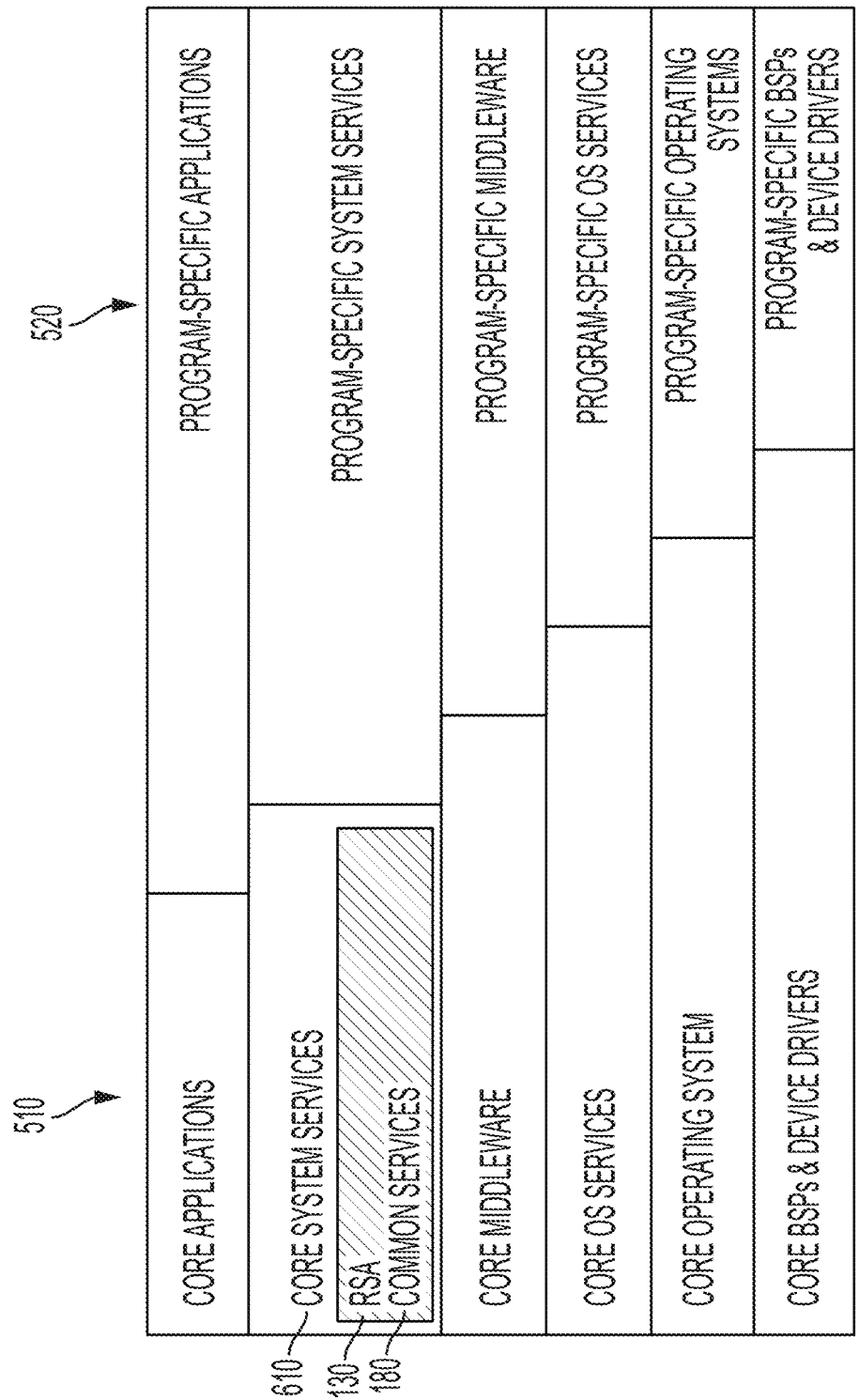
FIGS. 6A-9B illustrate the building of an example program in the RM system, beginning with core components in a core stack in FIGS. 6A-6B and adding various program-specific components in FIGS. 7A-9B.
Figure 6B:
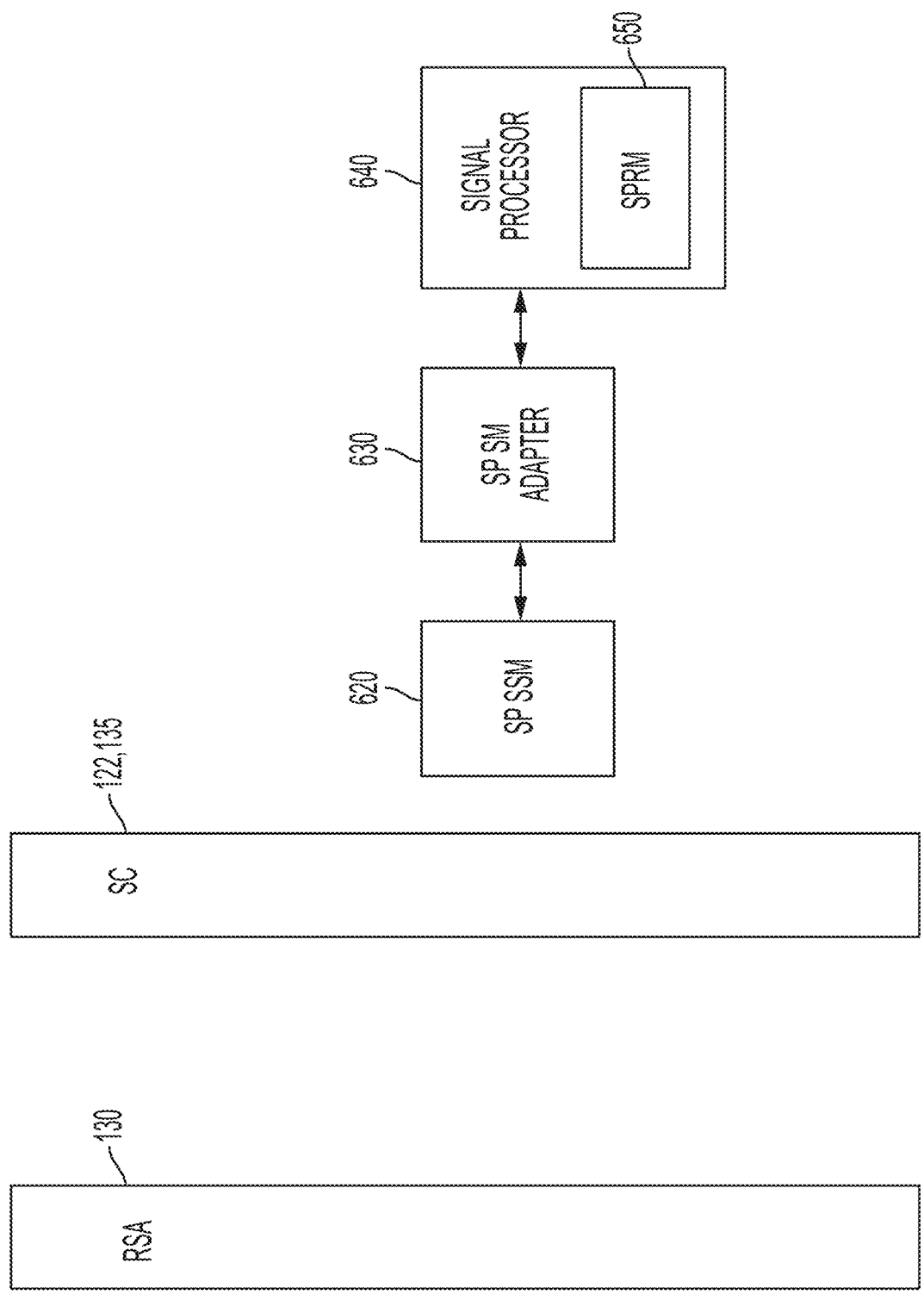
Figure 7A:
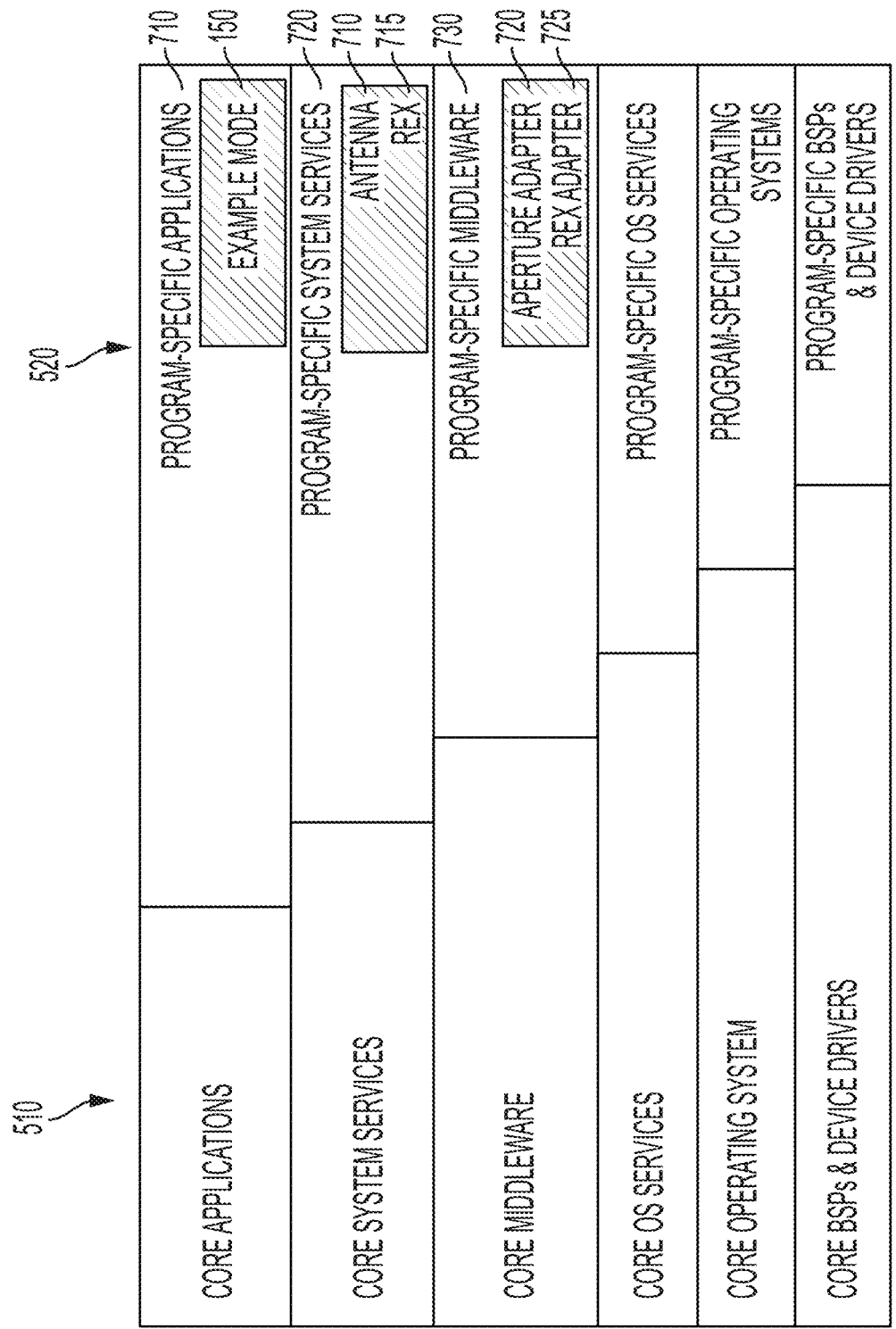
Figure 7B:
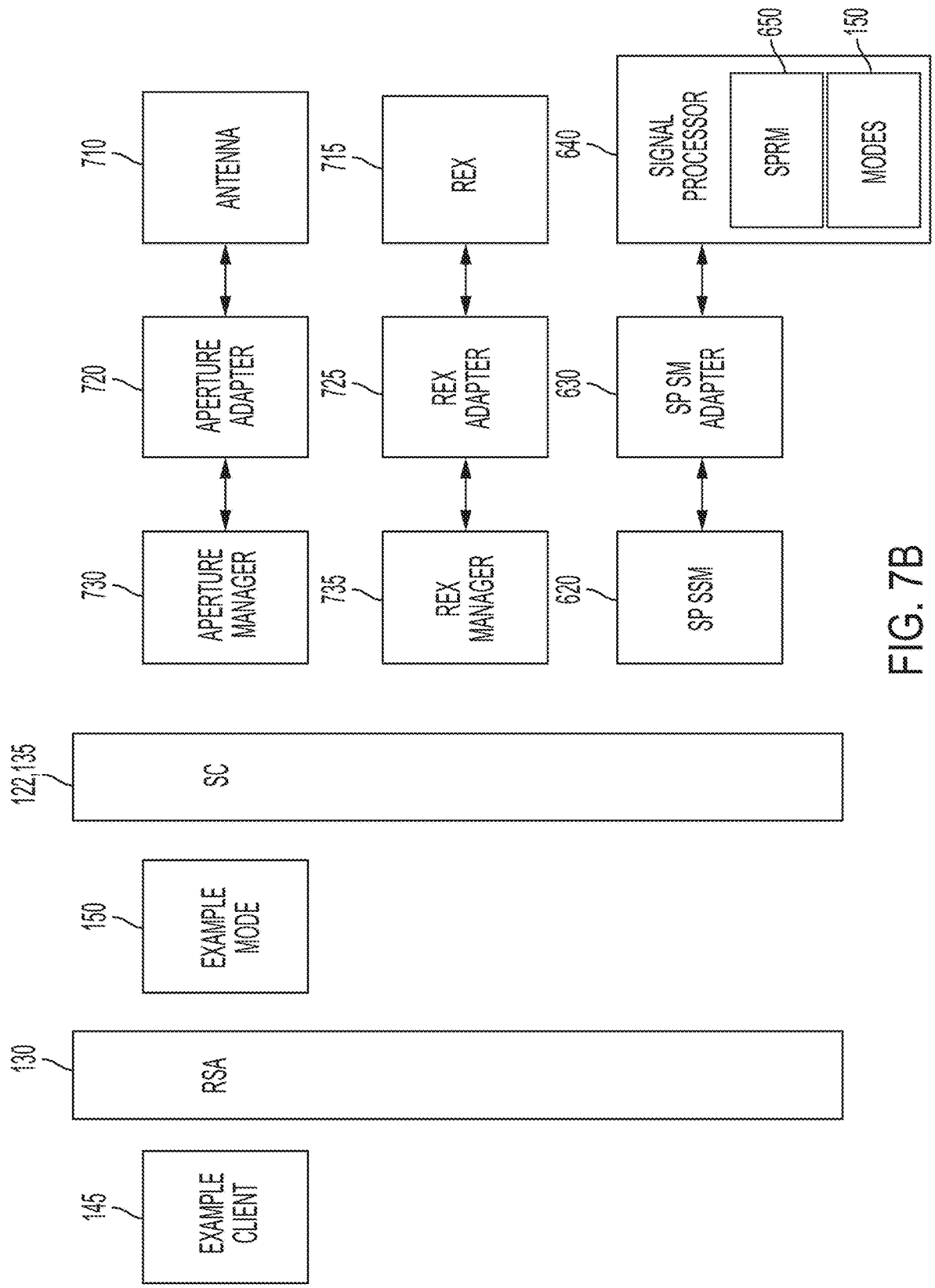
Figure 8A:
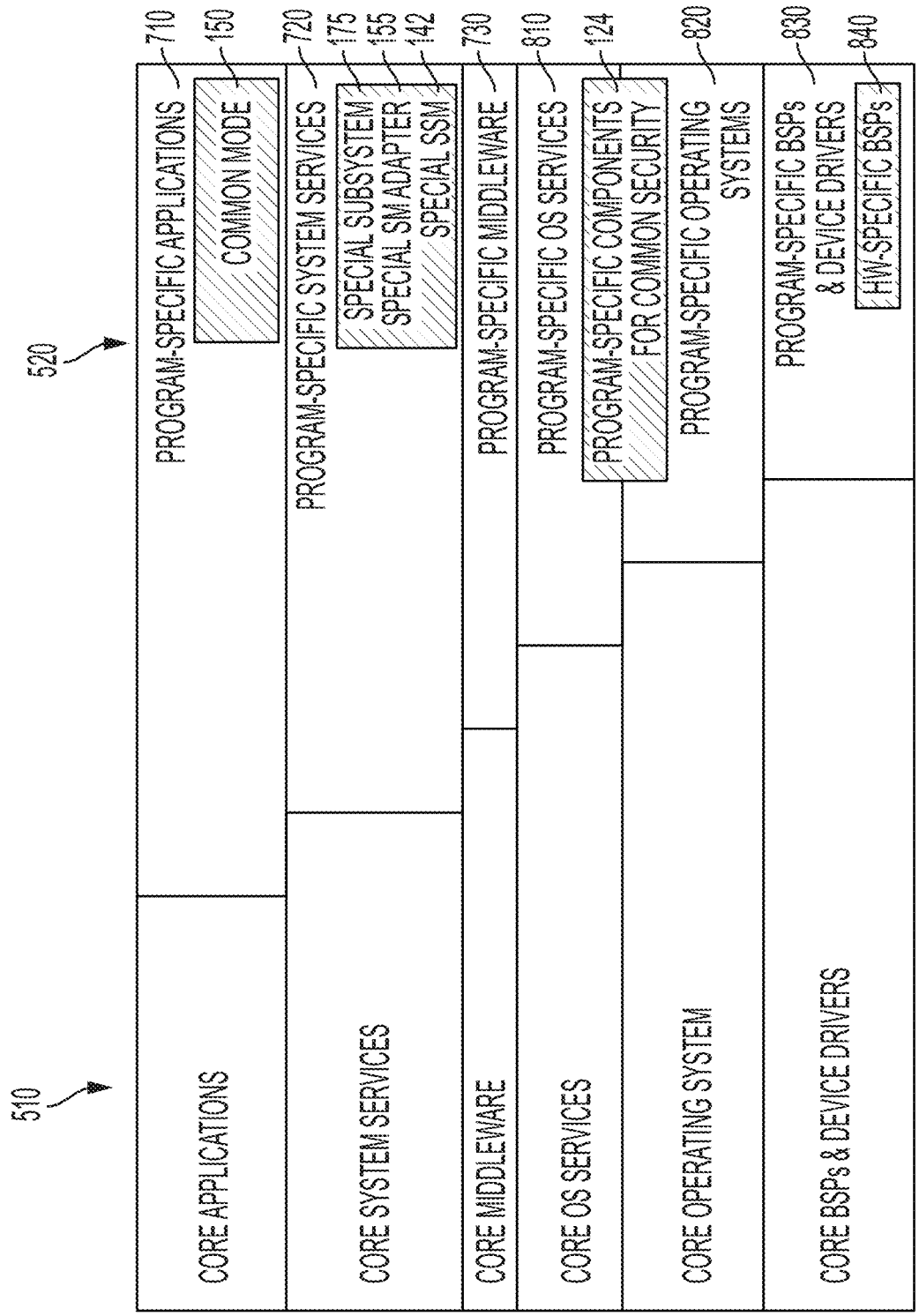
Figure 8B:
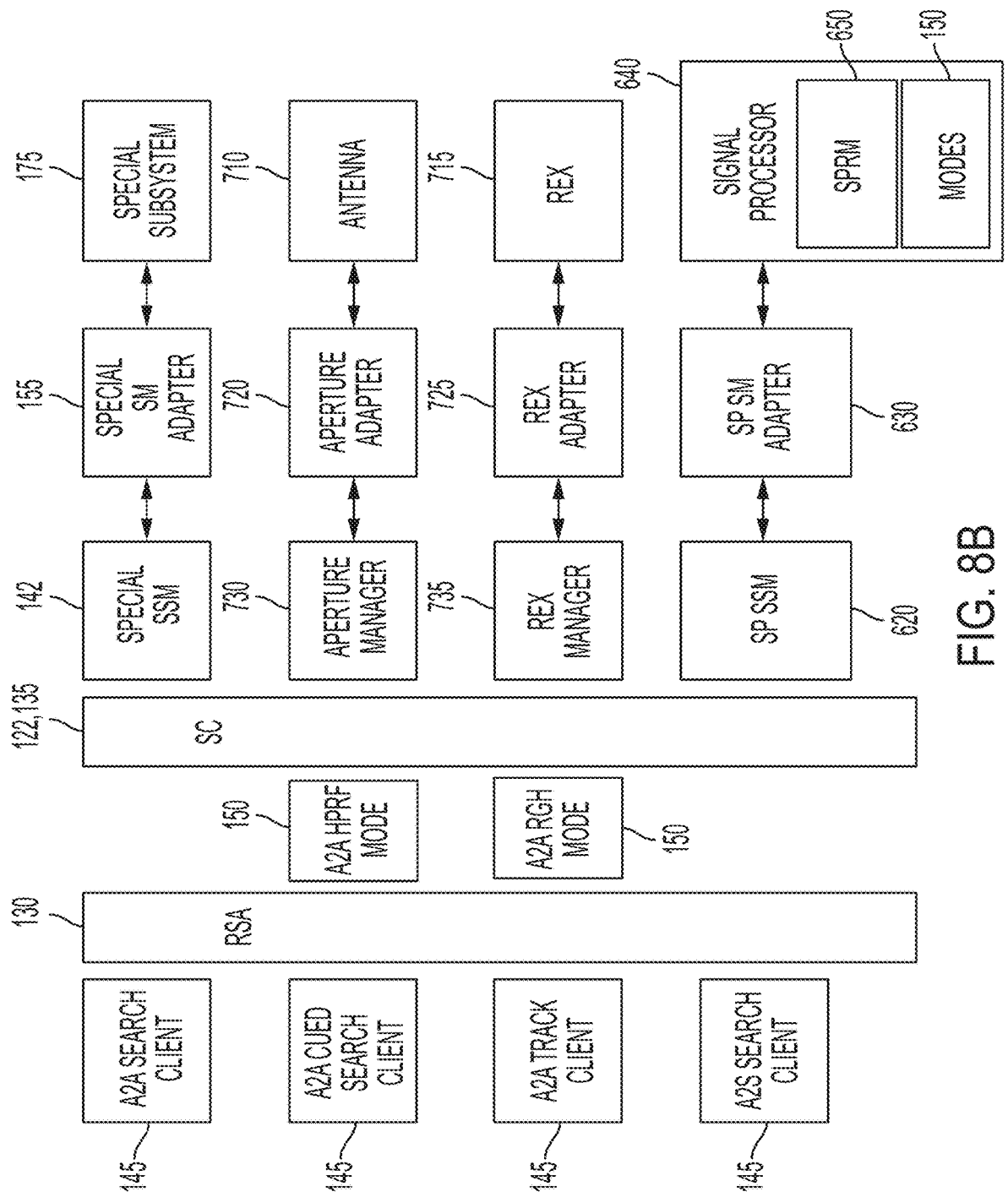
Figure 9A:
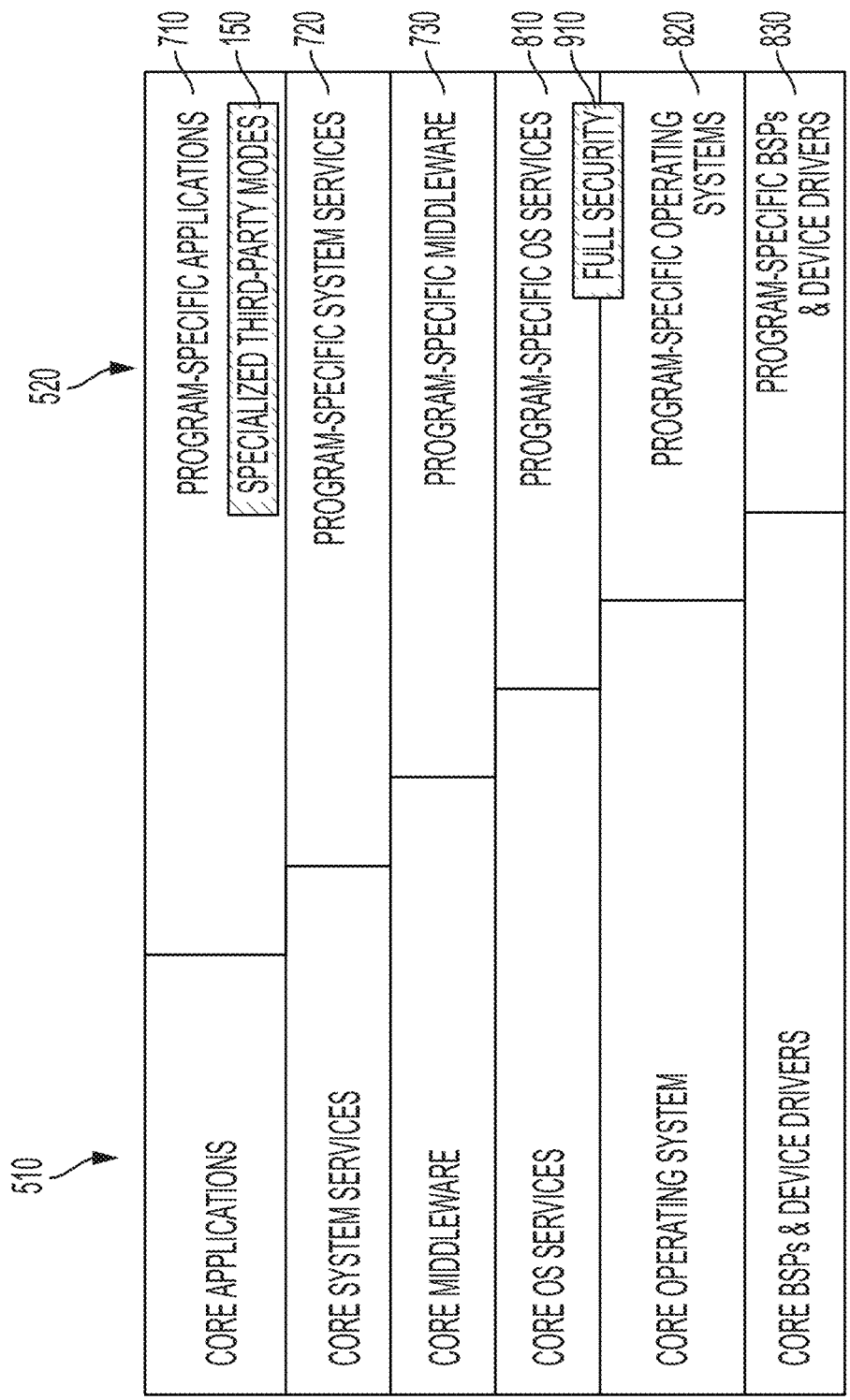
Figure 9B:
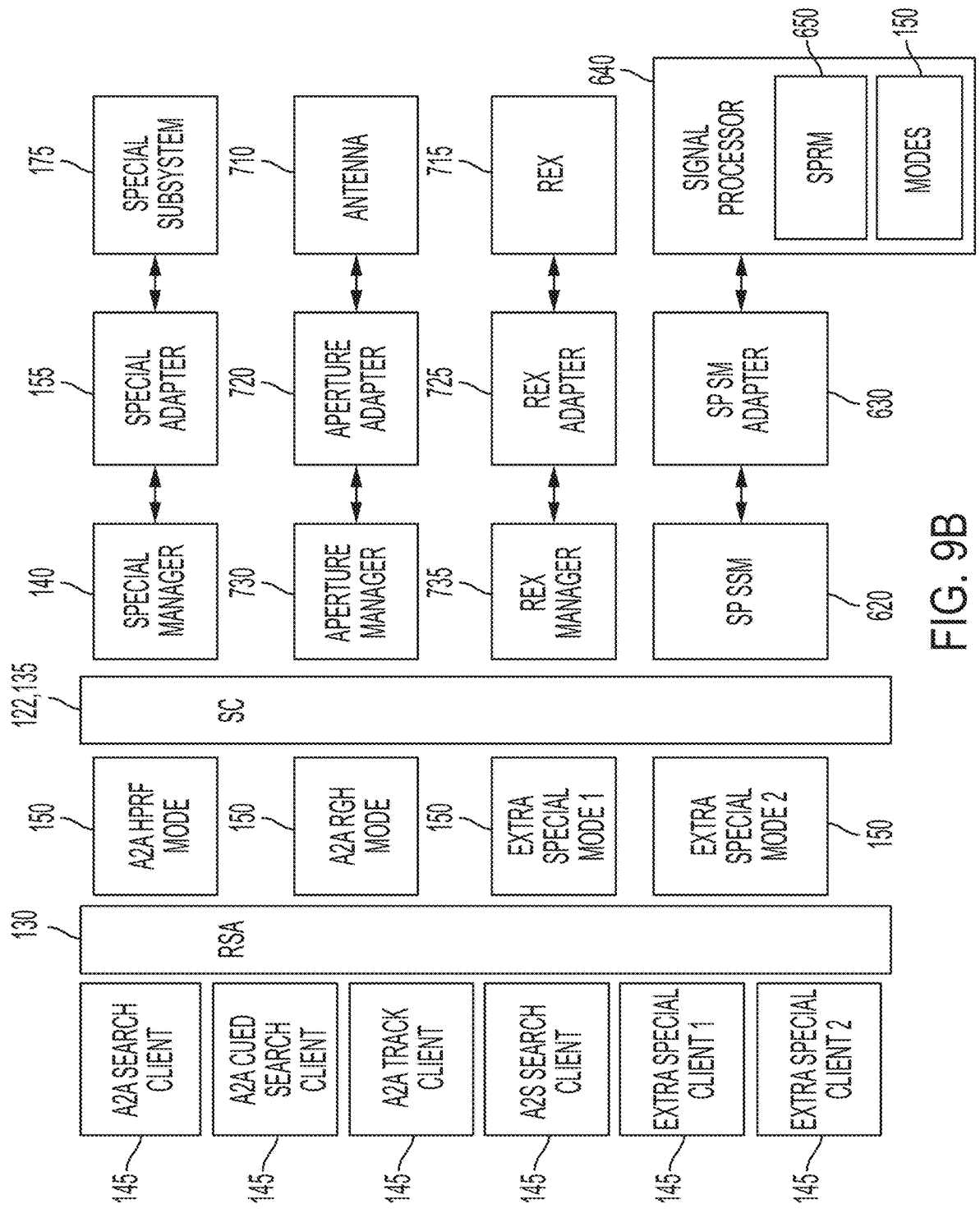

FIGS. 6-9 illustrate the building of an example program 230, beginning with core components 122 in the core stack 510 in FIG. 6 and adding various program-specific components 124 in FIGS. 7-9. More specifically, FIG. 6A shows additions to the core stack 510, and FIG. 6B shows the addition of core components 122 belonging to the core stack 510, while FIGS. 7A, 8A, and 9A illustrate the program-specific stack 520, and FIGS. 7B, 8B, and 9B show program-specific components 124 that are added by a user to extend aspects of the core stack 510.

As shown in FIG. 6A, the core stack 510 may include core system services 610, such as a common resource manager, which may be the RSA 130, and one or more common services 180, which have been modified by a user in this example. These are deemed "common" because, in some embodiments of the invention, they can be used across various programs 230 of the product family 310. However, through one or more APIs, a user can modify these core components 122. FIG. 6B illustrates a view of the Multi-Function Sensor(s) System 110, which shows the core components 122 included in the program 230 being built. As shown, these core components 122 may include the RSA 130, a front-end SC 135, an SP SSM 620, an SP SM adapter 630, a signal processor 640 as a subsystem 175 in communication with the SP SM adapter 630, and an SPRM 650 incorporated into the signal processor 640. Additionally, the common services 180 may be represented by one or more additional core components 122, where these common services 180 may include, for example, navigation, timekeeping, application management, logging, operative state, a track database, inter-process communication, or input/output. In some embodiments of the invention, the RM system 100 allows modification of each of these core components 122, such as by way of the Multi-Function Sensor(s) System 110.

FIGS. 7A-7B illustrate how capabilities can be added to the program of FIGS. 6A-6B, specifically by extending the applications 710, system services 720, and middleware 730 provided in the core stack 510, thereby adding components 120 to the program-specific stack 520. In this example, as shown in FIG. 7B, an example mode 150 includes an example client 145. For use of this example mode 150 and example client 145, an antenna 710 and a receiver/exciter (REX) 715 are added to the system services 720. Additionally, in this example, program-specific middleware 730 is added in the form of an aperture adapter 720 and a REX adapter 725, acting as SM adapters 155, and an aperture manager 730 and a REX manager 735, acting as SSMs 142, which communicate with the antenna 710 and the REX 720 respectively. Thus, to perform tasks, the example client 145 may communicate with the example mode 150 through the RSA 130, and the example mode 150 may communicate with the aperture manager 715, the REX manager 725, and the SP SSM 620 in turn.

FIGS. 8A-8B illustrate how further capabilities can be added to the program of FIGS. 7A-7B, specifically by extending the applications 710, system services 720, OS services 810, operating systems 820, and BSPs and device drivers 830 in the core stack 510, thereby adding components 120 to the program-specific stack 520 in those same categories. In this example, one or more common modes 150 are added as program-specific applications 710, in the form of an air-to-air (A2A) search client 145, an A2A-cued search client 145, an A2A track client 145, an air-to-surface (A2S) search client 145, an A2A high pulse repetition frequency (HPRF) mode 150, and an A2A range gated high (RGH) mode 150. In this example, a special subsystem 175, special SM adapter 155, and a special SSM 142 are added as program-specific system services 720. For enhanced common security, the OS services 810 and operating systems 820 are modified with program-specific components 124. Additionally, as shown in FIG. 8A only, in this example one or more hardware-specific BSPs 840 are added by the user.

FIG. 9A-9B illustrate how further capabilities can be added to the program of FIGS. 8A-8B, specifically by extending the applications 710, OS services 810, and operating systems 820 in the core stack 510, thereby adding components 120 to the program-specific stack 520 in those same categories. In this example, the user has included additional program-specific applications 710 in the form of specialized and third-party modes 150, which are labeled in FIG. 9B as extra special mode 1 and extra special mode 2, having respective clients 145 extra special client 1 and extra special client 2. Additionally, in this example the OS services 810 and operating systems 820 are extended to provide full security 910.

Thus, as shown by the example FIGS. 6-9, a wide range of programs 230 can be built according to the architecture 105 of the RM system 100 by extending components 120 in the core stack 510 with components 120 in the program-specific stack 520.

Figure 10:
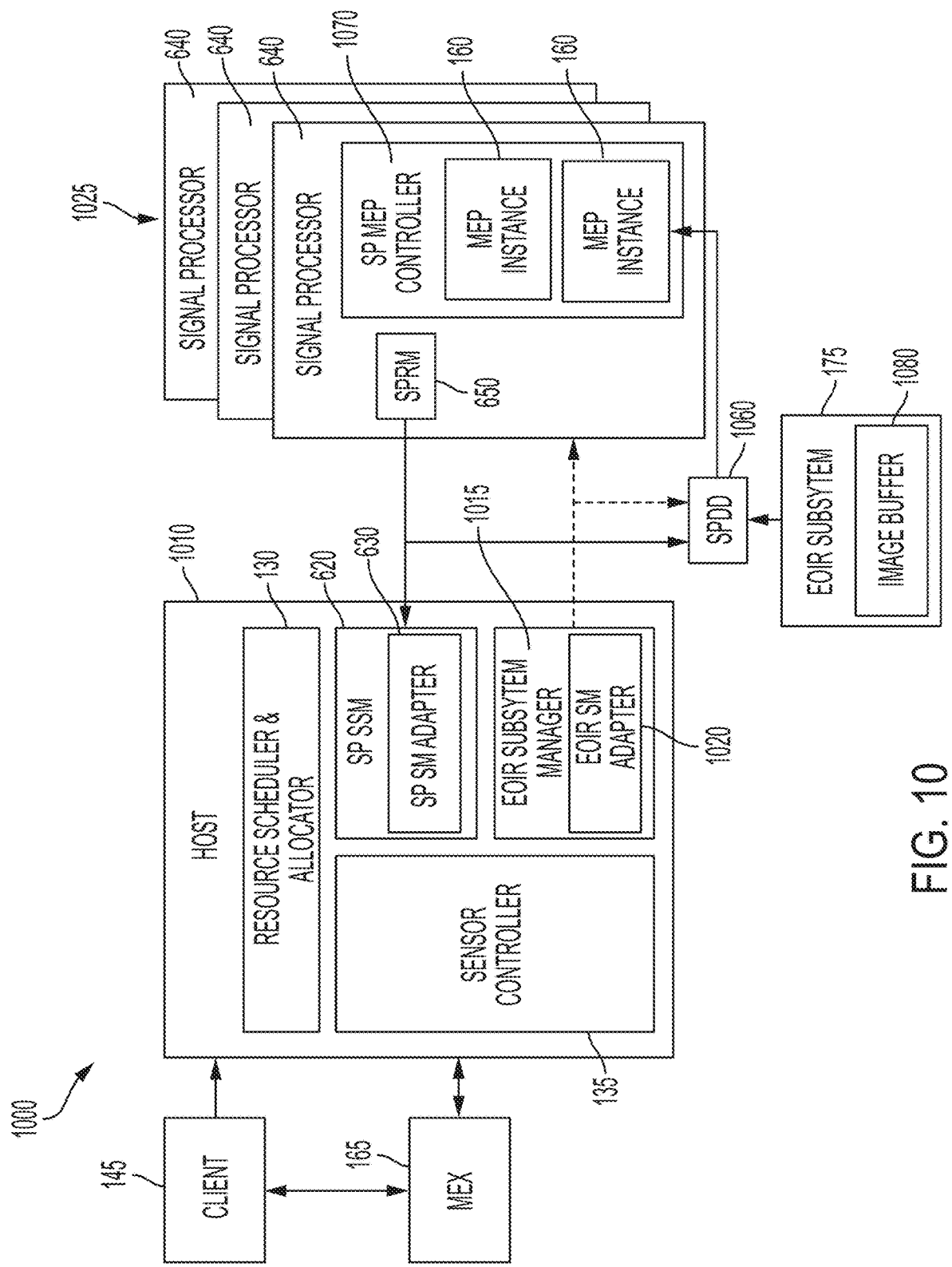
FIG. 10 is a block diagram of an default signal-processing (SP) architecture of the RM system, according to some embodiments.

In some embodiments, the RM system 100 and the architecture 105 of the RM system 100 support a further signal-processing architecture, which is an extension of the general architecture 105 described above. FIG. 10 is a block diagram of an SP architecture 1000 of the RM system 100, according to some embodiments of the invention. As shown, in some embodiments, a host 1010, which may be a data processor, includes an RSA 130 and an SC 135, as described above, along with an SP SSM 620 and an SP SM adapter 630, along with an optional EOIR SSM 1015 and EOIR SM adapter 1020, which may be instantiations of the base classes for SSMs 142 and SM adapters 155.

As shown in this example of FIG. 10, a client 145 may be in communication with the RSA 130 to make job requests, such as resource requests, and an MEX 165 may be in communication with that client 145 so as to assign jobs to the client 145. The MEX 165 may further be in communication with the SC 135 to enable the configuration of resources. It will be understood that this arrangement of complies with the general architecture 105 of the RM system 100 as described above.

The SP architecture 1000 may further include one or more SP nodes 1025, each of which may be a distinct computing device or portion of a computing device having a signal processor 640. Each SP node 1025 may include an SPRM 650 to manage that SP node 1025, where the SPRM 650 communicates with the SP SSM 620 of the host 1010, such as by way of the SP SM adapter 630, and with an SPDD 1060 to register the existence of the SP node 1025. Each SP node 1025 may include a respective SP MEP controller 1070 having one or more MEP instances 160, where each such MEP instance 160 has been implemented by the user. Each such MEP instance 160 may be in communication with SP products, such as an MEX 165, a client 145, or a tracker. Thus, in some embodiments, the SP SSM 620 collaborates with the SPRM 650 and one or more SP MEP controllers 1070 for management of signal-processing resources, such as a graphics processing unit (GPU), field programmable gate array (FPGA), and digital signal processing (DSP) hardware.

In some embodiments, the SP SSM 620 encapsulates signal-processing resource management by interfacing with the RSA 130 and the SC 135. Through interfacing with each SP node 1025, the SP SSM 620 may include RM feasibility checks, registration, and bookkeeping of available SP resources. Additionally or alternatively, the SP SSM 620 may provide interfaces for modes 150 running on the host 1010 to provide per-resource request (i.e., job-level) SP configuration parameters. Although the SP SSM 620 can be tailored by the user, the SP SSM 620 is a core component 122 that can be used for various sensor domains, according to some embodiments.

In some embodiments, an SPRM 650 is a process that runs on each SP node 1025. The SP SSM 620 on the host 1010 may collaborate with each SPRM 650 and the one or more SP MEP controllers 1070 for management of SP resources. The SPRM 650 may manage a cluster of signal-processing resources on each SP node 1025. For instance, the SPRM 650 may be responsible for querying the SP resources and publishing to the SP SSM 620 the resource information determined based on such queries (e.g., number of GPUs, memory handles for each GPU device). Although the SPRM 650 can be tailored the user, the SPRM 650 is a core component 122 that can be used for various sensor domains, according to some embodiments.

In some embodiments, the SP MEP controller 1070 on each SP node 1025 is a mode-independent infrastructure that interfaces with mode-specific signal-processing MEP code to spawn the mode-specific MEP instances 160 on the SP nodes 1025. The SP MEP controller 1070 may publish MEP information (e.g., number of MEP instances 160, MEP instance information) to the SPRM 650 and the SP SSM 620. Additionally or alternatively, the SP MEP controller 1070 may be responsible for managing and pre-allocating scratch memory and persistent memory among the MEP instances 160. In some embodiments, the SP MEP controller 1070 for the SP architecture 1000 is a core component 122 that can be used for various sensor domains. However, to create a managed variant, the user may implement MEP instances 160 that are controlled by the SP MEP controller 1070 to add mode-specific functionality.

In some embodiments, the SPDD 1060 is a high-bandwidth, smart, dynamic data router and aggregator for data, such as image, video, or in-phase and quadrature (IQ) data. The SPDD 1060 may interface with the SPRM 650 to determine SP configuration parameters for each resource request. In some embodiments, the SPDD 1060 is a core component 122 that can be used for various sensor domains. However, in some embodiments, the SP architecture 1000 allows for program-specific managed variants to customize behavior and data formats of the SPDD 1060. Various plugins may enable flexibility, such that a single service can be used for various sensor domains, such as both radar and EOIR data, for instance.

In some embodiments, the EOIR SSM 1015 of the host 1010 may also be in communication with each SP node 1025 and with the SPDD 1060. For instance, the EOIR SSM 1015 may contact each SP node 1025 along with the SPDD 1060 to configure that SP node 1025 as needed, such as by providing configuration parameters. The EOIR SSM 1015 may configure an EOIR subsystem 175, which may include one or more sensors 220, and which may include an image buffer 1080 used to store detected image data. The EOIR subsystem 175 may transmit the image data to the SPDD 1060, which may transmit the image data to an MEP instance 160 on an SP node 1025 as needed, for the SP node 1025 to process the image data captured by the EOIR subsystem 175. It will be understood that the use of an EOIR subsystem 175 and EOIR SSM 1015 in this SP architecture 1000 is exemplary only, and that other sensor domains are supported for signal processing according to some embodiments.

Figure 11:
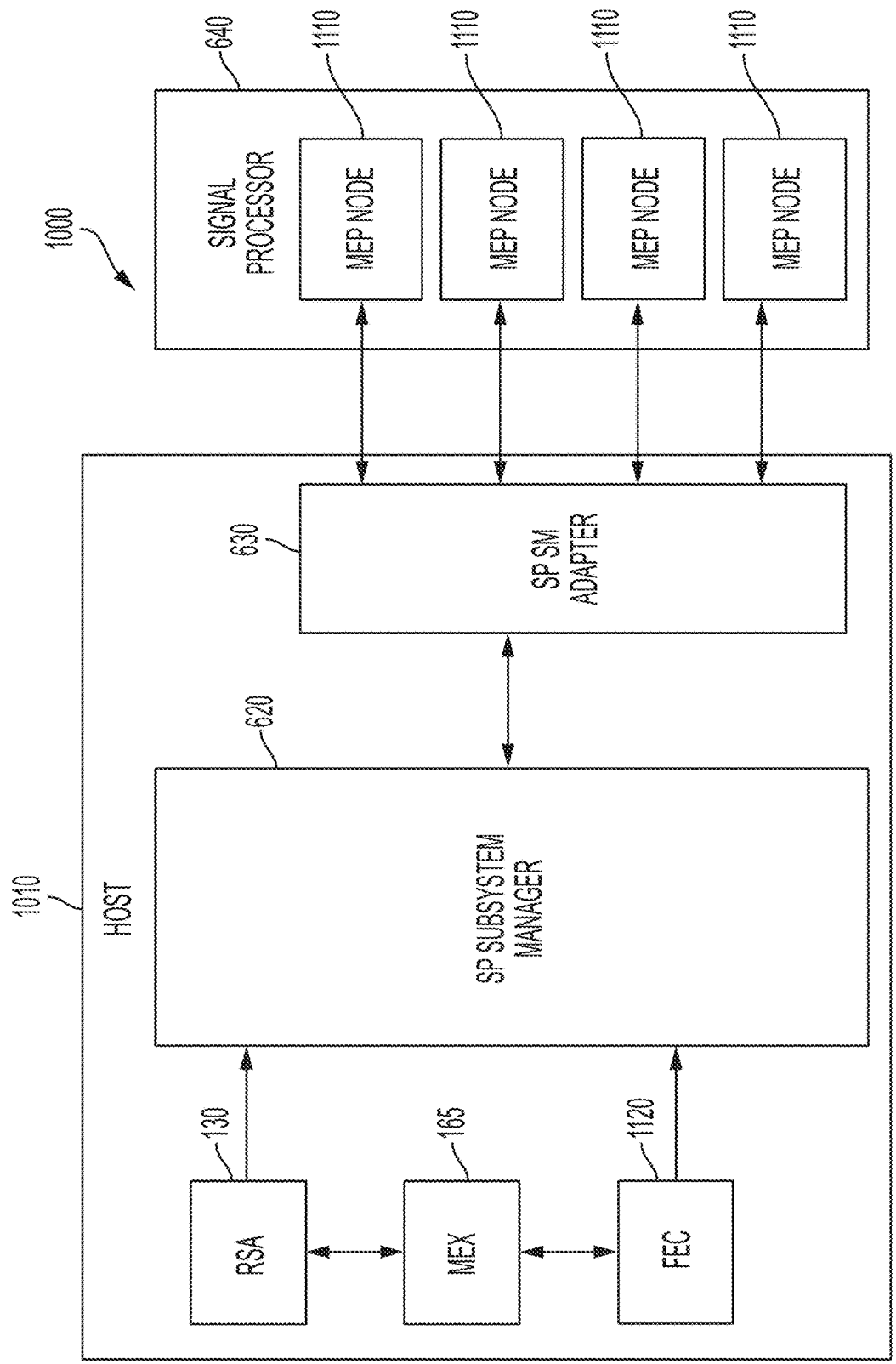
FIG. 11 is another block diagram of an default SP architecture according to some embodiments.

FIG. 11 is another block diagram of an example SP architecture 1000 according to some embodiments. As shown in FIG. 11, in this example, the host 1010 includes the SP SSM 620 in communication with the SP SM adapter 630, which is in communication with a signal processor 640 distributed across one or more MEP nodes 1110, each of which is or, at least, includes an SP MEP controller 1070. Generally, the SP SSM 620 may perform common services 180, such as initialization, BIT services, configuration of various components 120, or shutdown of various components 120 or of the program 230 as a whole. For instance, the SP SSM 620 may set the number of allowed MEP nodes 1110, and may set the maximum allowed concurrency of use for each resource.

The SP SSM 620 may configure each of the one or more MEP nodes 1110 through the SP SM adapter 630, which communicates with each such MEP node 1110. For instance, each MEP node 1110 may register with the SP SM adapter 630 through a language native to the SP MEP controller 1070 of the MEP node 1110, and the SP SM adapter 630 in turn may register the MEP node 1110 with the SP SSM 620. The SP SSM 620 may transmit to the SP SM adapter 630 configuration data (e.g., parameters) for each MEP node 1110, and the SP SSM 620 may configure each MEP node 1110 with the respective configuration data.

Through communications with the SP SSM 620, the RSA 130 may check the feasibility of any resource requests and may reserve resources as needed, and the front-end controller (FEC) 1120 may configure the SP subsystem 175. To enable a client 145 to access the SP subsystem 175, a respective MEX 165 of the client 145 may communicate with both the RSA 130 and the FEC 1120 and may further communicate with an MEP node 1110 associated with the client 145. When an MEP node 1110 has completed a task an no longer needs a set of resources, the SP SM adapter 630 may communicate the release of such resources to the SP SSM 620.

Figure 12:
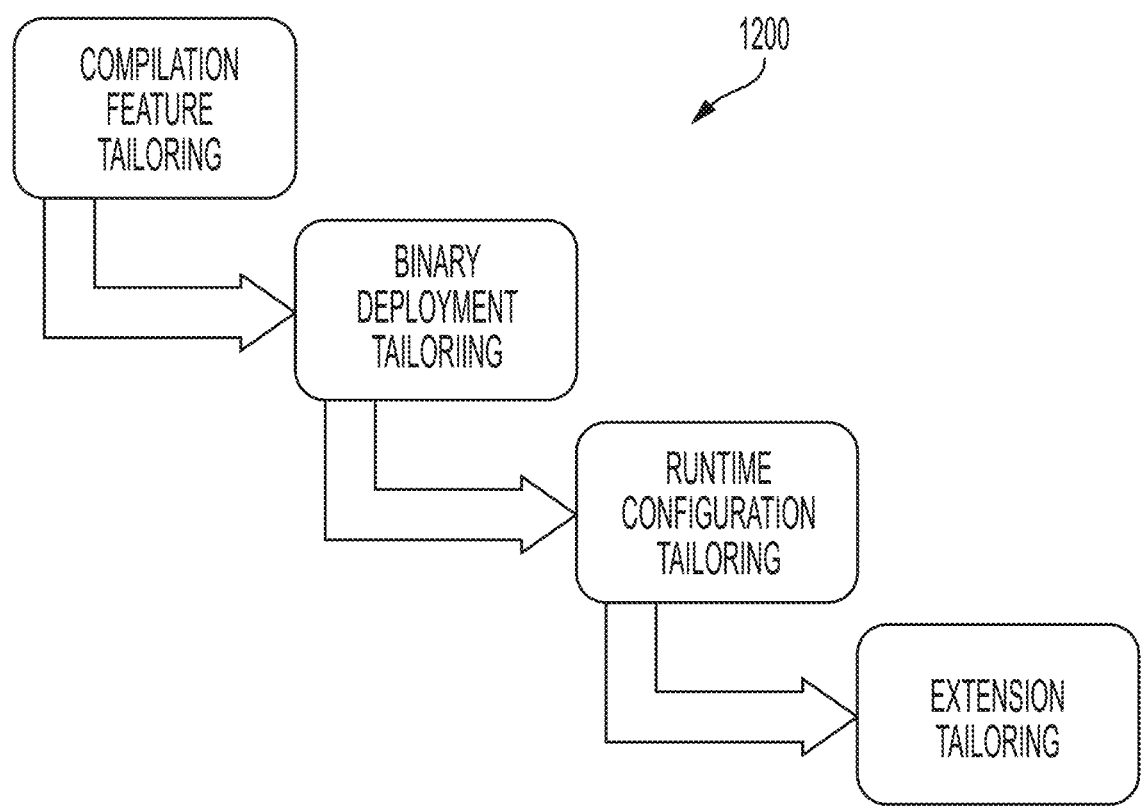
FIG. 12 illustrates a deployment system of the RM system, according to some embodiments of the invention.

FIG. 12 illustrates a deployment system 1200, or deployment architecture, of the RM system 100, which may enable microservices-based deployment, according to some embodiments of the invention. More specifically, in some embodiments, after a program 230 has been developed according to through the RM system 100, the deployment of the program 230 is customizable to the level of microservices. As shown in FIG. 12, the levels at which the program's deployment can be customized from the core level to the product-variant level or to a finer level.

For instance, during compilation, feature tailoring may be performed for deployment. For example, and not by way of limitation, deployment may exclude unneeded or unwanted functions; tailor out features for the purposes of export compliance or other reasons, and intelligently manage software dependencies at the microservices level. To manage software dependencies, the deployment system 1200 may understand detailed software dependencies and may utilize dependencies to determine which components 120 are necessary for the provision of each service in the program 230. In other words, in some embodiments of the invention, the deployment system 1200 only builds what is necessary. To this end, the deployment system 1200 may provide modular shared libraries to minimize recompilation.

Tailoring may also occur during binary deployment. For instance, the deployment system 1200 may push only necessary binaries and dependencies to each node from a common baseline; custom build the deployment to match the laboratory versus tactical hardware; and leverage tools for deployment across cluster management and remote application management.

In some embodiments of the invention, runtime configuration is also tailorable during deployment. Specifically, for instance, configuration files may be established and may be written or modified by the user to enable or disable certain functionalities during runtime. In this manner, even features that are deployed need not be active during runtime. For instance, some features may be available to perform checks during a safe mode, while all features may be available during normal operation. For another example, according to the set configuration, the available features may be determined, at least in part, based on the hardware configuration over which the program 230 is being run.

Additionally or alternatively, in some embodiments of the invention, the ability to add further extensions after deployment is also tailorable by the user. For instance, an mode development kit (MDK) may be incorporated into a package for the product to enable third party developers add modes, or a software development kit (SDK) may be incorporated to able additional extensions, such as additional services. The packaging may further include one or more of an installer, a package manager, and one or more zip files or tarballs. In some embodiments of the invention, export compliance rules may be automatically or manually checked to control what aspects of the program are distributed.

As discussed above in detail, embodiments of the RM system 100 can utilize the general architecture 105 as well as the SP architecture 1000 to provide massive commonality along with cost and schedule savings in developing new programs 230, because program development can focus on variants rather than core functionality. In some embodiments, the RM system 100 allows new possibilities with respect to utilizing multifunction sensors 220 and heterogenous combinations of sensors 220 with unprecedented response times. Embodiments of the RM system 100 enable mode portability across sensor domains. Further, due to customizable deployment, embodiments of the RM system 100 enable functionality and services to be stripped as needed for compliance reasons or other considerations, such as export compliance.

Figure 13:
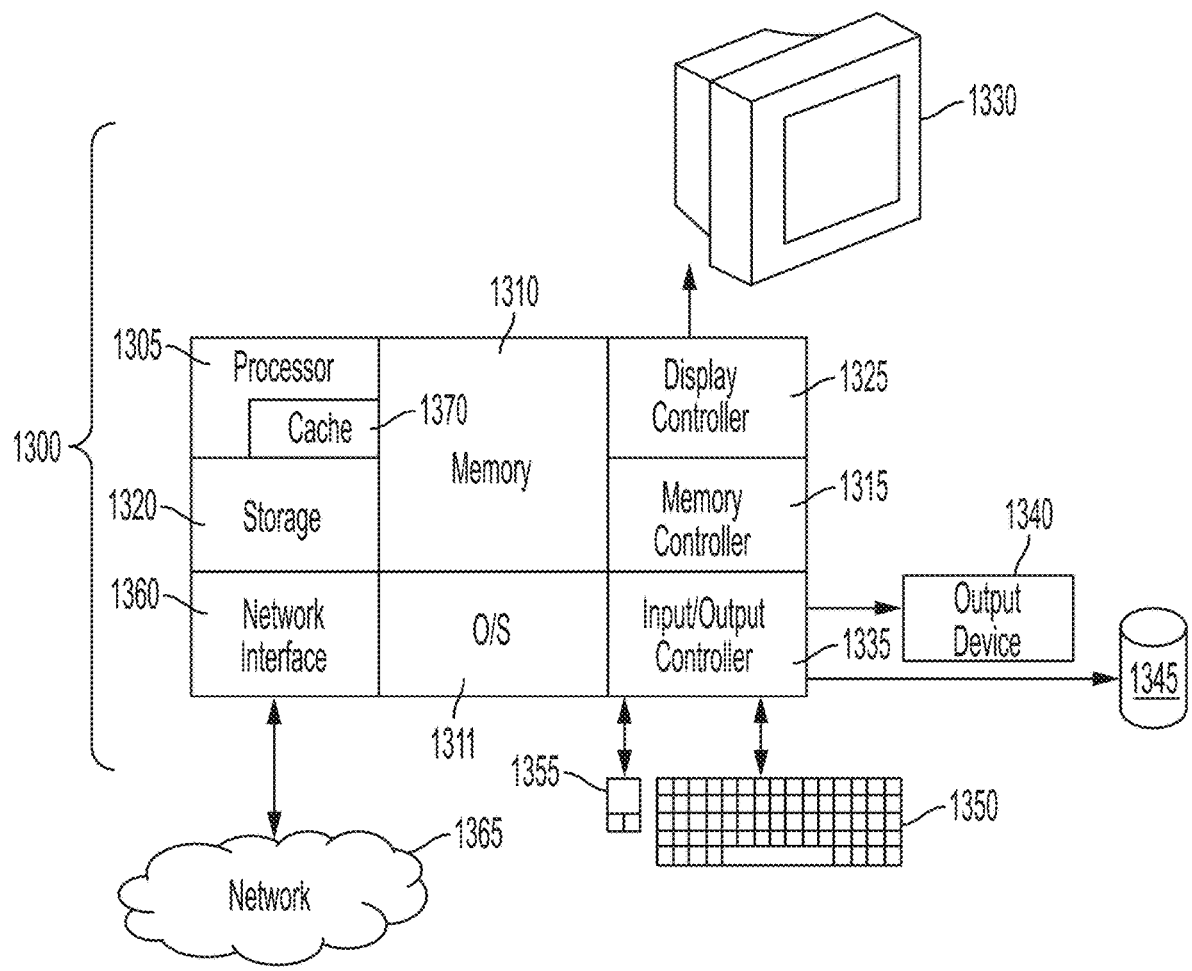
FIG. 13 is a block diagram of a computer system for implementing some or all aspects of the RM system, according to some embodiments of this invention.

FIG. 13 is a block diagram of a computer system 1300 for implementing some or all aspects of the RM system 100, according to some embodiments of this invention. The RM systems 100 and methods described herein may be implemented in hardware, software (e.g., firmware), or a combination thereof. In some embodiments, the methods described may be implemented, at least in part, in hardware and may be part of the microprocessor of a special or general-purpose computer system 1300, such as a personal computer, workstation, minicomputer, or mainframe computer. For example, and not by way of limitation, the IDE 110 of the RM system may run on a computer system 1300, and the RM system 100 itself may be a computer system 1300 or portion thereof.

In some embodiments, as shown in FIG. 13, the computer system 1300 includes a processor 1305, memory 1310 coupled to a memory controller 1315, and one or more input devices 1345 and/or output devices 1340, such as peripherals, that are communicatively coupled via a local I/O controller 1335. These devices 1340 and 1345 may include, for example, a printer, a scanner, a microphone, and the like. Input devices such as a conventional keyboard 1350 and mouse 1355 may be coupled to the I/O controller 1335. The I/O controller 1335 may be, for example, one or more buses or other wired or wireless connections, as are known in the art. The I/O controller 1335 may have additional elements, which are omitted for simplicity, such as controllers, buffers (caches), drivers, repeaters, and receivers, to enable communications.

The I/O devices 1340, 1345 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 1305 is a hardware device for executing hardware instructions or software, particularly those stored in memory 1310. The processor 1305 may be a custom made or commercially available processor, a central processing unit (CPU), an auxiliary processor among several processors associated with the computer system 1300, a semiconductor-based microprocessor (in the form of a microchip or chip set), a macroprocessor, or other device for executing instructions. The processor 1305 includes a cache 1370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 1370 may be organized as a hierarchy of more cache levels (L1, L2, etc.).

The memory 1310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1310 may incorporate electronic, magnetic, optical, or other types of storage media. Note that the memory 1310 may have a distributed architecture, where various components are situated remote from one another but may be accessed by the processor 1305.

The instructions in memory 1310 may include one or more separate programs, each of which comprises an ordered listing of executable instructions for implementing logical functions. In the example of FIG. 13, the instructions in the memory 1310 include a suitable OS 1311. The operating system 1311 essentially may control the execution of other computer programs and provides scheduling, input-output control, file and data management, memory management, and communication control and related services.

Additional data, including, for example, instructions for the processor 1305 or other retrievable information, may be stored in storage 1320, which may be a storage device such as a hard disk drive or solid-state drive. The stored instructions in memory 1310 or in storage 1320 may include those enabling the processor to execute one or more aspects of the RM system 100 and methods of this disclosure.

The computer system 1300 may further include a display controller 1325 coupled to a display 1330. In some embodiments, the computer system 1300 may further include a network interface 1360 for coupling to a network 1365. The network 1365 may be an IP-based network for communication between the computer system 1300 and an external server, client and the like via a broadband connection. The network 1365 transmits and receives data between the computer system 1300 and external systems. In some embodiments, the network 1365 may be a managed IP network administered by a service provider. The network 1365 may be implemented in a wireless fashion, e.g., using wireless protocols and technologies, such as WiFi, WiMax, etc. The network 1365 may also be a packet-switched network such as a local area network, wide area network, metropolitan area network, the Internet, or other similar type of network environment. The network 1365 may be a fixed wireless network, a wireless local area network (LAN), a wireless wide area network (WAN) a personal area network (PAN), a virtual private network (VPN), intranet or other suitable network system and may include equipment for receiving and transmitting signals.

The RM system 100 and methods according to this disclosure may be embodied, in whole or in part, in computer program products or in computer systems 1300, such as that illustrated in FIG. 13.

The description of the present invention has been presented for the purpose of illustration. This description is not intended to be exhaustive or to limit the invention to the forms disclosed. Many modifications and variations will be apparent to those of ordinary skill in the art without departing from the scope and spirit of the invention. The embodiments of the invention discussed herein were chosen and described in order to best explain the principles of the invention and the practical applications, and to enable others of ordinary skill in the art to understand the invention. While certain embodiments of the invention have been described, it will be understood that those skilled in the art, both now and in the future, may make various improvements and enhancements that fall within the scope of the claims that follow.

What is claimed is:

1. A system comprising:
   at least one client configured to perform at least one task corresponding to a given program component;
   a sensor domain; and
   a plurality of program components comprising:
   one or more sensor-agnostic components preestablished, wherein each sensor-agnostic component is configured to be independent of the sensor domain and one or more sensor-specific components included in the sensor domain, the one or more sensor-agnostic components including the at least one controller configured to execute the plurality of program components over a chosen sensor domain;
   the one or more sensor-specific components preestablished and being a separate and individual component from the one or more sensor-agnostic components, wherein each sensor-specific component is customizable for use with the chosen sensor domain; and
   a base subsystem manager (SSM) class configured to be instantiated into a first SSM for a first subsystem comprising one or more resources, wherein the first SSM is in signal communication with the at least one controller, and wherein at least one of the one or more resources of the first subsystem is an electronic sensor in signal communication with the at least one controller; and
   a development environment configured to access the one or more sensor-agnostic components and the one or more sensor-specific components, and to enable selection and combination of the plurality of program components and the one or more sensor-specific components;
   wherein the one or more sensor-agnostic components and the one or more sensor-specific components are configured to interconnect in a plurality of combinations to form a program,
   wherein the one or more sensor-agnostic components further include a resource scheduler and allocator (RSA) in signal with the at least one controller and configured to communicate with the base SSM class to allocate a plurality of sensors in scheduling resource requests of each SSM instantiated from the base SSM class, to allot time on each sensor included in the scheduling resource requests, and to configure the sensor to perform sensor operation responsive to the schedule resource requests,
   wherein the one or more sensor-specific components comprise a first subsystem (SM) adapter configured to translate communications between the first SSM and the first subsystem, wherein the first SM adapter is customizable by a user to utilize native communications of the first subsystem; and
   wherein the at least one client outputs at least one sensor request to at least one sensor among the plurality of sensors, and wherein the RSA receives the at least one sensor request, allots the time on the at least one sensor corresponding to the sensor request, and configures the at least one sensor to perform the sensor operations necessary for the client to perform the at least one task.

2. The system of claim 1, wherein the at least one controller includes a sensor controller (SC) providing an application programming interface for utilizing the plurality of resources allocated by the RSA.

3. The system of claim 2, wherein the one or more sensor-agnostic components comprise a signal-processing subsystem manager (SP SSM) configured to manage a plurality of signal-processing resources by interfacing with the RSA and the SC and by communicating with one or more signal-processing nodes utilizing the plurality of signal-processing resources.

4. The system of claim 1, wherein each of the one or more sensor-agnostic components and each of the one or more sensor-specific components are customizable by the user in developing the program.

5. The system of claim 1, further comprising a deployment architecture enabling customized deployment of the program, wherein the deployment architecture enables customizing at least one of compilation, binary deployment, runtime configuration, and extension tailoring of the program.

6. A computer-implemented method comprising:
- at least one client configured to perform at least one task corresponding to a given program component;
- a sensor domain; and
- providing a plurality of program components comprising:
  - one or more sensor-agnostic components preestablished, wherein each sensor-agnostic component is configured to be independent of the sensor domain and one or more sensor-specific components included in the sensor domain, the one or more sensor-agnostic components including the at least one controller configured to execute the plurality of program components over a chosen sensor domain;
  - the one or more sensor-specific components preestablished and being a separate and individual component from the one or more sensor-agnostic components, wherein each sensor-specific component is customizable for use with the chosen sensor domain; and
  - a base subsystem manager (SSM) class configured to be instantiated into a first SSM for a first subsystem comprising one or more resources, wherein the first SSM is in signal communication with the at least one controller, and wherein at least one of the one or more resources of the first subsystem is an electronic sensor in signal communication with the at least one controller; and
- combining at least a subset of the one or more sensor-agnostic components and the one or more sensor-specific components into a program;
- wherein the one or more sensor-agnostic components and the one or more sensor-specific components are configured to interconnect in a plurality of combinations,
- wherein the one or more sensor-agnostic components further include a resource scheduler and allocator (RSA) in signal with the at least one controller and configured to communicate with the base SSM class to allocate a plurality of sensors in scheduling resource requests of each SSM instantiated from the base SSM class, to allot time on each sensor included in the scheduling resource requests, and to configure the sensor to perform sensor operation responsive to the schedule resource requests,
- wherein the one or more sensor-specific components comprise a first subsystem (SM) adapter configured to translate communications between the first SSM and the first subsystem, wherein the first SM adapter is customizable by a user to utilize native communications of the first subsystem,
- wherein the at least one client outputs at least one sensor request to at least one sensor among the plurality of sensors, and wherein the RSA receives the at least one sensor request, allots the time on the at least one sensor corresponding to the sensor request, and configures the at least one sensor to perform the sensor operations necessary for the client to perform the at least one task.

7. The computer-implemented method of claim 6, wherein the at least one controller includes a sensor controller (SC) providing an application programming interface for utilizing the plurality of resources allocated by the RSA.

8. The computer-implemented method of claim 6, further comprising enabling user-customization of each of the one or more sensor-agnostic components and each of the one or more sensor-specific components.

9. The system of claim 6, further comprising enabling user-customization of deployment of the program, by enabling user-customization of at least one of compilation, binary deployment, runtime configuration, and extension tailoring of the program.

10. A Multi-Function Sensor System (MFSS) comprising:
- at least one client configured to perform at least one task corresponding to a given program component;
- a sensor domain; and
- an interface enabling access to a plurality of program components and enabling selection and combination of the plurality of program components to form a program, the plurality of program components comprising:
  - one or more sensor-agnostic components preestablished, wherein each sensor-agnostic component is configured to be independent of the sensor domain and one or more sensor-specific components included in the sensor domain, the one or more sensor-agnostic components including the at least one controller configured to execute the plurality of program components over a chosen sensor domain;
  - the one or more sensor-specific components preestablished and being a separate and individual component from the one or more sensor-agnostic components, wherein each sensor-specific component is customizable for use with the chosen sensor domain; and
  - a base subsystem manager (SSM) class configured to be instantiated into a first SSM for a first subsystem comprising one or more resources, wherein the first SSM is in signal communication with the at least one controller, and wherein at least one of the one or more resources of the first subsystem is an electronic sensor in signal communication with the at least one controller;
- wherein the one or more sensor-agnostic components and the one or more sensor-specific components are configured to interconnect in a plurality of combinations,
- wherein the one or more sensor-agnostic components further include a resource scheduler and allocator (RSA) in signal with the at least one controller and configured to communicate with the base SSM class to allocate a plurality of sensors in scheduling resource requests of each SSM instantiated from the base SSM class, to allot time on each sensor included in the scheduling resource requests, and to configure the sensor to perform sensor operation responsive to the schedule resource requests,
- wherein the one or more sensor-specific component comprise a first subsystem (SM) adapter configured to translate communications between the first SSM and the first subsystem, wherein the first SM adapter is customizable by a user to utilize native communications of the first subsystem,
- wherein the at least one client outputs at least one sensor request to at least one sensor among the plurality of sensors, and wherein the RSA receives the at least one sensor request, allots the time on the at least one sensor corresponding to the sensor request, and configures the at least one sensor to perform the sensor operations necessary for the client to perform the at least one task.

11. The MFSS of claim 10, wherein the at least one controller includes a sensor controller (SC) providing an application programming interface for utilizing the plurality of resources allocated by the RSA.

12. The MFSS of claim 11, wherein the one or more sensor-agnostic components comprise a signal-processing subsystem manager (SP SSM) configured to manage a plurality of signal-processing resources by interfacing with the RSA and the SC and by communicating with one or more signal-processing nodes utilizing the plurality of signal-processing resources.

13. The MFSS of claim 10, wherein each of the one or more sensor-agnostic components and each of the one or more sensor-specific components are customizable by the user in developing the program.

14. The MFSS of claim 10, further comprising an interface enabling customized deployment of the program, by enabling user-customization of at least one of compilation, binary deployment, runtime configuration, and extension tailoring of the program.

* * * * *